(12) United States Patent
Yokoi et al.

(10) Patent No.: US 10,689,724 B2
(45) Date of Patent: Jun. 23, 2020

(54) STEEL SHEET WITH STRAIN INDUCED TRANSFORMATION TYPE COMPOSITE STRUCTURE AND METHOD OF MANUFACTURING SAME

(71) Applicant: NIPPON STEEL & SUMITOMO METAL CORPORATION, Tokyo (JP)

(72) Inventors: Tatsuo Yokoi, Oita (JP); Hiroshi Shuto, Oita (JP); Yuuki Kanzawa, Himeji (JP); Natsuko Sugiura, Kimitsu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 123 days.

(21) Appl. No.: 15/747,971

(22) PCT Filed: Jul. 31, 2015

(86) PCT No.: PCT/JP2015/071848
§ 371 (c)(1),
(2) Date: Jan. 26, 2018

(87) PCT Pub. No.: WO2017/022027
PCT Pub. Date: Feb. 9, 2017

(65) Prior Publication Data
US 2018/0216206 A1 Aug. 2, 2018

(51) Int. Cl.
*C22C 38/32* (2006.01)
*C22C 38/28* (2006.01)
(Continued)

(52) U.S. Cl.
CPC ............... *C21D 9/46* (2013.01); *B32B 15/01* (2013.01); *C21D 6/001* (2013.01); *C21D 6/002* (2013.01);
(Continued)

(58) Field of Classification Search
CPC .............. B32B 15/01; C21D 2211/001; C21D 2211/002; C21D 2211/005;
(Continued)

(56) References Cited

U.S. PATENT DOCUMENTS

2007/0119521 A1 5/2007 Yokota et al.
2013/0276940 A1 10/2013 Nakajima et al.
(Continued)

FOREIGN PATENT DOCUMENTS

CN 101688272 A 3/2010
CN 103827335 A 5/2014
(Continued)

OTHER PUBLICATIONS

International Search Report for PCT/JP2015/071848 dated Oct. 27, 2015.
(Continued)

*Primary Examiner* — Jenny R Wu
(74) *Attorney, Agent, or Firm* — Birch, Stewart, Kolasch & Birch, LLP

(57) ABSTRACT

There is provided a steel sheet with strain induced transformation type composite structure having a predetermined chemical composition in which a microstructure at the ¼ thickness of the steel sheet includes, by area ratio, 50% to 85% of a polygonal ferrite, 3% to 10% of a residual austenite, 5% to 47% of bainite and 1% or less of a fresh martensite and a tempered martensite in total and satisfies the equation of $0.01 < \text{Ex.C/fsd} \leq 0.015$, the microstructure includes $1 \times 10^{16}$ pieces/cm$^3$ or more of precipitates containing TiC, an average grain diameter of the residual austenite 1.0 μm to 5.0 μm at an equivalent circle diameter, an average of closest distances of the austenite is 3.0 μm to 10.0 μm, and an average diameter of the precipitates is 3 nm or less.

9 Claims, 2 Drawing Sheets

(51) Int. Cl.

| | |
|---|---|
| *C22C 38/16* | (2006.01) |
| *C22C 38/12* | (2006.01) |
| *C22C 38/10* | (2006.01) |
| *C22C 38/08* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 8/02* | (2006.01) |
| *C21D 6/00* | (2006.01) |
| *C23C 2/28* | (2006.01) |
| *B32B 15/01* | (2006.01) |
| *C21D 9/46* | (2006.01) |
| *C22C 38/54* | (2006.01) |

(52) U.S. Cl.
CPC ............ *C21D 6/005* (2013.01); *C21D 6/007* (2013.01); *C21D 6/008* (2013.01); *C21D 8/0205* (2013.01); *C21D 8/0226* (2013.01); *C21D 8/0263* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/16* (2013.01); *C22C 38/28* (2013.01); *C22C 38/32* (2013.01); *C22C 38/54* (2013.01); *C23C 2/28* (2013.01); *C21D 2211/001* (2013.01); *C21D 2211/002* (2013.01); *C21D 2211/005* (2013.01); *C21D 2211/008* (2013.01)

(58) Field of Classification Search
CPC .. C21D 2211/008; C21D 6/001; C21D 6/002; C21D 6/005; C21D 6/007; C21D 6/008; C21D 8/0205; C21D 8/0226; C21D 8/0263; C21D 9/46; C22C 38/00; C22C 38/001; C22C 38/002; C22C 38/008; C22C 38/02; C22C 38/04; C22C 38/06; C22C 38/08; C22C 38/10; C22C 38/12; C22C 38/16; C22C 38/28; C22C 38/32; C22C 38/54; C23C 2/28
See application file for complete search history.

(56) References Cited

U.S. PATENT DOCUMENTS

| | | | |
|---|---|---|---|
| 2014/0014236 A1 | 1/2014 | Nozaki et al. | |
| 2014/0044988 A1 | 2/2014 | Futamura et al. | |
| 2014/0234658 A1 | 8/2014 | Nozaki et al. | |
| 2015/0203949 A1 | 7/2015 | Yokoi et al. | |

FOREIGN PATENT DOCUMENTS

| | | | |
|---|---|---|---|
| EP | 1 350 859 A1 | 10/2003 | |
| JP | 5-112846 A | 5/1993 | |
| JP | 5-195150 A | 8/1993 | |
| JP | 10-219387 A | 8/1998 | |
| JP | 2002-129286 A | 5/2002 | |
| JP | 2002-256389 A | 9/2002 | |
| JP | 2002-322540 A | 11/2002 | |
| JP | 2002-322541 A | 11/2002 | |
| JP | 2003-89848 A | 3/2003 | |
| JP | 2003-193190 A | 7/2003 | |
| JP | 2003-321737 A | 11/2003 | |
| JP | 2003-321738 A | 11/2003 | |
| JP | 2003-321739 A | 11/2003 | |
| JP | 2004-2969 A | 1/2004 | |
| JP | 2004-143518 A | 5/2004 | |
| JP | 2004-204326 A | 7/2004 | |
| JP | 2007-56348 A | 3/2007 | |
| JP | 2007-63668 A | 3/2007 | |
| JP | 2007-146209 A | 6/2007 | |
| JP | 2010-150581 A | 7/2010 | |
| JP | 2011-184788 A | 9/2011 | |
| JP | 2012-251201 A | 12/2012 | |
| JP | 2015-40322 A | 3/2015 | |
| JP | 2015-124410 A | 7/2015 | |
| KR | 10-0650301 B1 | 11/2006 | |
| KR | 10-2015-0050592 A | 5/2015 | |
| WO | WO 2014/051005 A | 4/2014 | |
| WO | WO-2014051005 A1 * | 4/2014 | |

OTHER PUBLICATIONS

Matsumura et al., "Enhancement of Elongation by Retained Austenite in Intercritical Annealed 0.4C-1.5Si-0.8Mn Steel", Transactions ISIJ, 1987, vol. 27, pp. 570-579.
Office Action for TW 104124925 dated Mar. 1, 2016.
Written Opinion of the International Searching Authority for PCT/JP2015/071848 (PCT/ISA/237) dated Oct. 27, 2015.
Chinese Search Report and Office Action, dated Jan. 31, 2019, for counterpart Chinese Application No. 201580082044.6, with a partial English translation of the Chinese Search Report.
Extended European Search Report, dated Jan. 31, 2019, for counterpart European Application No. 15900341.7.
Korean Notice of Allowance, dated Jan. 14, 2020, for Korean Application No. 10-2018-7004276, with an English translation.

\* cited by examiner

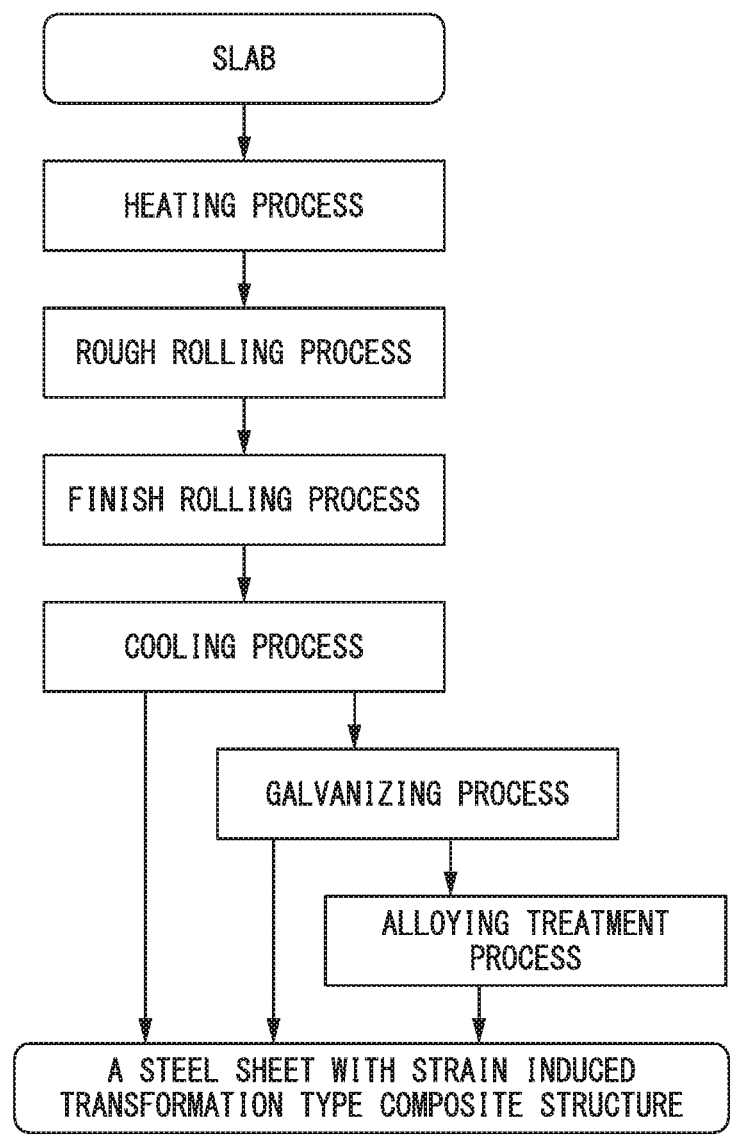

STEEL SHEET WITH STRAIN INDUCED TRANSFORMATION TYPE COMPOSITE STRUCTURE AND METHOD OF MANUFACTURING SAME

TECHNICAL FIELD OF THE INVENTION

The present invention relates to a steel sheet with strain induced transformation type composite structure and a method of manufacturing the same, particularly relates to a high strength steel sheet with strain induced transformation type composite structure having excellent surface properties and hole expansibility, and a method of manufacturing the same.

RELATED ART

Recently, weight reduction of various parts constituting a car has been advanced for the purpose of improving fuel efficiency of a car. The way of weight reduction varies depending on the performance requirements of each part. For example, thinning is carried out for frame components by highly strengthening steel sheets, and steel sheets are replaced by light metal such as Al alloy in panel parts. However, since light metal such as Al alloy is expensive in a case of being compared to steel, its application is mainly limited to luxury cars at present. Meanwhile, demand for cars has shifted from developed countries to emerging countries, and it is expected that both weight reduction and price reduction will be required to be compatible in the future. Therefore, regardless of parts, there is an increasing demand for weight reduction by means of high-strengthening and thinning of steel.

In addition, in the related art, aluminum castings and forged products have been often used for passenger car wheels among vehicle components from the viewpoint of design characteristics. However, recently, products including steel pressed products, which have design characteristics equivalent to those of aluminum wheels achieved by devising materials and engineering methods, have appeared. In order to realize design characteristics and beauty characteristics equivalent to those of aluminum wheels in steel wheels, in addition to excellent fatigue durability and corrosion resistance, design characteristics and beauty characteristics are particularly required for wheel disks which are visually recognized by end users. Therefore, even in steel sheets used for wheel disks (steel sheets for wheel disks), in addition to high-strengthening for achieving thinning and improvement in fatigue durability and corrosion resistance, improvement in workability and improvement in surface properties for improving design characteristics and beauty characteristics as parts are required.

In a process of forming a wheel disk, it is particularly difficult to process a hat portion. In addition, in member characteristics of a wheel, fatigue durability is managed based on the strictest standard. Therefore, in the related art, as characteristics required in steel sheets for wheel disks, stretchability, drawability, and fatigue durability have been particularly regarded as important matters. Particularly, in regard to the fatigue durability, in a case where a wheel is mounted in a car, and in a case where a load is repetitively applied to the wheel during actual traveling, stress concentration caused due to geometric shapes, load applying modes, and load applying directions occurs in locations such as the rear side of a hat portion or decorative openings. For this reason, in steel sheets for wheel disks, notch fatigue properties, that is, fatigue properties under stress concentrated circumstances have been regarded as important matters.

In addition, generally, steel sheets for wheel disks require high strength of 540 MPa or greater. However, recently, there is demand for higher strength up to 780 MPa or greater.

In the related art, as these steel sheets for wheel disks, in consideration of fatigue durability as members, composite structure steel sheets (so-called dual phase steel, will be referred to as "DP steel" hereinafter) having a composite structure which consists of ferrite and martensite and is excellent in fatigue properties have been used.

Non-Patent Document 1 discloses that uniform elongation is improved even with the same strength by establishing a composite structure as in DP steel in which the structure (micro-structure) of the steel sheet is constituted by ferrite and martensite.

As described above, it is disclosed that the strength and the elongation can be improved in DP steel. However, it is known that DP steel has low local deformability represented by bending formability, hole expansibility, and burring. The reason is that since the strength difference between ferrite and martensite in microstructures is significant, significant strain and stress are concentrated in ferrite in the vicinity of martensite during forming and cause a crack.

Based on the knowledge described above, a high-strength steel sheet having excellent hole expansibility achieved by reducing the strength difference between microstructures is proposed. For example, Patent Document 1 proposes a steel sheet in which the strength is ensured and hole expansibility is significantly improved by constituting the microstructures mainly with bainite or bainitic ferrite. The technology disclosed in Patent Document 1 is a technology of suppressing concentration of strain and stress caused due to the above-described hardness difference and obtaining excellent hole expansibility by causing the microstructure to be a substantially single microstructure of bainite or bainitic ferrite.

However, since the high-strength steel sheet disclosed in Patent Document 1 has a single microstructure of bainite or bainitic ferrite, although the steel sheet is excellent in hole expansibility, in a case where the steel sheet is assumed to be applied to a wheel disk or the like, sufficient elongation cannot be obtained.

In regard to such a disadvantage, for example, Patent Documents 2 to 4 each propose a high-strength steel sheet of which the microstructure is a single microstructure of ferrite excellent in elongation and which is highly strengthened by means of precipitation strengthening of carbides such as Ti and Mo.

However, a steel sheet disclosed in Patent Document 2 is required to include a large amount of Mo, and a steel sheet disclosed in Patent Document 3 is required to include a large amount of Ti, Mo, and V. Therefore, the technologies of Patent Documents 2 and 3 have a problem of high alloy cost. In addition, a steel sheet disclosed in Patent Document 4 is required to include a large amount of V and is also required to be cooled in the middle of rolling in order to refine the crystal grains. Therefore, there is a disadvantage in terms of manufacturing cost.

In addition, although these steel sheets exhibit high elongation compared to steel sheets having the single microstructure with bainite or bainitic ferrite, since ferrite itself is significantly high-strengthened, the elongation deteriorates. Therefore, both elongation and hole expansibility cannot be compatible at a high level.

Patent Document 5 proposes DP steel having excellent hole expansibility. In place of martensite, bainite is generated in the DP steel, which has composite structures of ferrite and bainite, so that the strength difference between microstructures is reduced.

However, in the technology disclosed in Patent Document 5, since the strength is ensured by means of bainite of which contribution to strength improvement is smaller than that of martensite, the area ratio of the bainite structure is required to be increased. If the area ratio of bainite is high, elongation deteriorates. Therefore, both elongation and hole expansibility cannot be compatible at a high level.

Moreover, Patent Documents 6 to 8 each propose a steel sheet in which the strength difference between microstructures with respect to a full hard structure is reduced by means of precipitation strengthening of ferrite in DP steel.

However, in the technologies disclosed in Patent Documents 6 to 8, it is essential to include Mo, and there is a problem of high manufacturing cost. Moreover, even though precipitation strengthening of ferrite is performed, the strength difference with respect to martensite having full hard structures is significant. Therefore, sufficient hole expansibility cannot be obtained.

Patent Document 9 proposes a steel sheet which is DP steel having tensile strength of 780 MPa or greater and in which elongation and hole expansibility are improved by controlling the martensite fraction within 3% to 10%.

As shown in Patent Document 9, in DP steel, in a case where the microstructure is caused to be a composite structure of ferrite and martensite, a large amount of Si is included for the purpose of promoting ferritic transformation, in many cases. However, in DP steel including a large amount of Si, a tiger-striped scale pattern called red scale (Si scale) is generated on a surface of the steel sheet. Therefore, it is difficult to apply a steel sheet including a large amount of Si to high-design wheel disks requiring beauty characteristics.

In the steel sheet disclosed in Patent Document 9, although excellent elongation and hole expansibility are achieved, since 0.5% or more of Si is included, it is difficult to prevent the problem of the Si scale pattern described above. Therefore, it is difficult to be applied to various steel sheets used for high-design wheel disks requiring beauty characteristics.

In regard to this disadvantage, for example, Patent Documents 10 and 11 each disclose a technology in which red scale is restrained from being generated by suppressing the Si content to 0.3% or less, and precipitates are refined by adding Mo, so that a high-tensile hot-rolled steel sheet having high strength and excellent stretch flangeability is obtained.

However, in the steel sheets disclosed in Patent Documents 10 and 11, it is essential to include expensive Mo, the cost increases. In addition, in these inventions, the microstructure is constituted by a ferrite single phase practically subjected to precipitation strengthening, and elongation is insufficient. In addition, notch fatigue properties are not examined either.

As a technology of improving fatigue properties of a steel sheet having a composite structure, Patent Document 12 discloses a technology of improving low-cycle fatigue properties by including Si, Al, and Mn in a predetermined relationship.

However, Patent Document 12 presents no technological disclosure regarding notch fatigue properties, that is, fatigue properties under stress concentrated circumstances. In addition, in the technology of Patent Document 12, since 0.6% or more of Si is required to be included, it is difficult to prevent a Si scale pattern from being generated.

Patent Documents 13 and 14 each disclose a technology of manufacturing a steel sheet with strain induced transformation type composite structure (hereinafter, will be referred to as "TRIP steel") in which Al and Si are included in a composite manner, and the microstructure includes residual austenite, thereby being more excellent in ductility than DP steel. In addition, in the steel sheets of Patent Documents 13 and 14, hole expansibility is also improved by having polygonal ferrite as a primary phase.

However, Patent Documents 13 and 14 present no technological disclosure regarding notch fatigue properties, that is, fatigue properties under stress concentrated circumstances. In addition, such TRIP steel has a disadvantage of low local deformability such as hole expansibility required when processing a hub hole or decorative openings of a wheel in a case where the TRIP steel is assumed to be applied to a steel wheel.

PRIOR ART DOCUMENT

Patent Document

[Patent Document 1] Japanese Unexamined Patent Application, First Publication No. 2003-193190
[Patent Document 2] Japanese Unexamined Patent Application, First Publication No. 2003-089848
[Patent Document 3] Japanese Unexamined Patent Application, First Publication No. 2007-063668
[Patent Document 4] Japanese Unexamined Patent Application, First Publication No. 2004-143518
[Patent Document 5] Japanese Unexamined Patent Application, First Publication No. 2004-204326
[Patent Document 6] Japanese Unexamined Patent Application, First Publication No. 2003-321737
[Patent Document 7] Japanese Unexamined Patent Application, First Publication No. 2003-321738
[Patent Document 8] Japanese Unexamined Patent Application, First Publication No. 2003-321739
[Patent Document 9] Japanese Unexamined Patent Application, First Publication No. 2011-184788
[Patent Document 10] Japanese Unexamined Patent Application, First Publication No. 2002-322540
[Patent Document 11] Japanese Unexamined Patent Application, First Publication No. 2002-322541
[Patent Document 12] Japanese Unexamined Patent Application, First Publication No. 2010-150581
[Patent Document 13] Japanese Unexamined Patent Application, First Publication No. H5-112846
[Patent Document 14] Japanese Unexamined Patent Application, First Publication No. 2002-256389

Non-Patent Document

[Non-Patent Document 1] Matsumura et al, Trans. ISIJ, vol. 27 (1987), p. 570

DISCLOSURE OF THE INVENTION

Problems to be Solved by the Invention

TRIP steel is a steel sheet acquired by dispersing residual austenite and bainite in soft ferrite. TRIP steel is highly strengthened and has extremely high uniform elongation. However, a strength difference is present between ferrite or bainite and residual austenite, or between ferrite or bainite and martensite resulted due to strain induced transformation of residual austenite. Therefore, concentration of strain and stress due to the strength difference is caused on an interface of crystal at the time of deformation. Furthermore, since a void causing ductile fracture is likely to be generated and grow, local deformability of TRIP steel related to hole expansibility is extremely low.

Meanwhile, it is known that in regard to notch fatigue properties which are important when fatigue properties are evaluated under stress concentrated circumstances, being different from ordinary fatigue properties having a fracture life mostly occupied by duration until a fatigue crack appears, the most part of the fracture life is affected by propagation of a fatigue crack. TRIP steel contains soft ferrite, and residual austenite and bainite dispersed in the ferrite. In TRIP steel having such a structure, a fatigue crack is propagated in soft ferrite by priority. On the other hand, relatively full hard residual austenite or full hard martensite resulted due to strain induced transformation of residual austenite becomes an obstacle to propagation of a fatigue crack so that the propagation velocity slows down. Therefore, it is considered that TRIP steel has high notch fatigue properties.

However, up to the present time, no detailed research has been carried out regarding the microstructure of TRIP steel, such as the fraction and the size of residual austenite, the behavior of generation and growth of a void causing ductile fracture, and the propagation velocity of a fatigue crack. Therefore, no steel sheet with strain induced transformation type composite structure (TRIP steel) having improved local deformability such as hole expansibility and the slow propagation velocity of a fatigue crack has ever been provided until now.

Moreover, no steel sheet, in which generation of a Si scale pattern is prevented in order to realize design characteristics and beauty characteristics in steel wheels equivalent to those of aluminum wheels and which is excellent in all of strength elongation balance, corrosion resistance, hole expansibility, and notch fatigue properties, has ever been provided until now.

The present invention has been made in consideration of the foregoing problems. An object of the present invention is to provide a high-strength steel sheet with strain induced transformation type composite structure having tensile strength of 540 MPa or greater while being excellent in strength elongation balance (TS×El), hole expansibility, corrosion resistance, and notch fatigue properties and also being excellent in surface properties at the same time, and a method of manufacturing the same.

Means for Solving the Problem

In order to prevent generation of a Si scale pattern and to achieve excellent surface properties and corrosion resistance, on the premise of TRIP steel (steel sheet with strain induced transformation type composite structure) having elements included in steel (chemical composition) in which a Si content is restricted, the inventors have investigated intensively regarding a relationship among the component, the microstructure, the strength, the elongation, the hole expansibility and the notch fatigue properties of TRIP steel. As a result, the inventors have found a technique in which the strength, the elongation, the hole expansibility, and the notch fatigue properties are improved by controlling the elements included in steel (chemical composition), and the dispersion state, the shape, and the size of residual austenite.

Specifically, the inventors have learned that if a suitable amount Al is included as a substitute of Si which is generally used as a ferrite former (ferritic transformation promoting element) in TRIP steel, generation of a Si scale pattern is prevented and a composite structure having polygonal ferrite as a main phase and having residual austenite and bainite as a second phase is promoted. Moreover, the inventors have learned that the elongation, the hole expansibility, and the notch fatigue properties can be improved by controlling the fraction, the size, and the like of residual austenite in an optimal range.

In addition, the inventors have studied not only the elements included in steel but also a method for hot rolling and have revealed that these optimal materials can be acquired with favorable reproducibility.

The present invention has been made based on the knowledge described above. The gist thereof is as follows.

(1) According to an aspect of the present invention, there is provided a steel sheet with strain induced transformation type composite structure, the steel sheet includes, as a chemical composition, by mass %, C: more than 0.075% and 0.150% or less, Si: 0.50% or less, Mn: 0.20% to 3.00%, P: 0.010% or less, S: 0.005% or less, Al: 0.040% to 1.500%, N: 0.0100% or less, Ti: 0.015% to 0.200%, Nb: 0% to 0.060%, Cu: 0% to 1.20%, Ni: 0% to 0.60%, Mo: 0% to 1.00%, V: 0% to 0.200%, Cr: 0% to 2.00%, W: 0% to 0.50%, Mg: 0% to 0.0100%, Ca: 0% to 0.0100%, REM: 0% to 0.100%, B: 0% to 0.0020%, and a remainder includes Fe and impurities, and in which the chemical composition satisfies the following equation (i); a microstructure at the ¼ thickness of the steel sheet includes, by area ratio, 50% to 85% of a polygonal ferrite, 3% to 10% of a residual austenite, 5% to 47% of a bainite, and 1% or less of a fresh martensite and a tempered martensite in total, and satisfies the following equation (ii), the microstructure incudes $1\times10^{16}$ pieces/cm$^3$ or more of precipitates containing a TiC, an average grain diameter of the residual austenite is 1.0 μm to 5.0 μm at an equivalent circle diameter, an average of closest distances of the residual austenite is 3.0 μm to 10.0 μm, and an average diameter of the precipitates is 3 nm or less, $$\text{Ti}-48\times(\text{N}/14+\text{S}/32)\geq 0 \tag{i}$$

$$0.01<\text{Ex.C}/fsd\leq 0.015 \tag{ii}$$

where symbols for elements in the equations are amounts of the elements included in the steel sheet by mass %, the fsd in the equation (ii) is an area ratio (%) of the residual austenite in the microstructure, and Ex.C is calculated by the following equation (iii).

$$\text{Ex.C}=\text{C}-12\times(\text{Ti}/48+\text{Nb}/93-\text{N}/14-\text{S}/32) \tag{iii}$$

(2) In the steel sheet with strain induced transformation type composite structure according to (1), the chemical composition may include, by mass %, one or more selected from the group consisting of Nb: 0.005% to 0.060%, Cu: 0.02% to 1.20%, Ni: 0.01% to 0.60%, Mo: 0.01% to 1.00%, V: 0.01% to 0.200%, Cr: 0.01% to 2.00%, and W: 0.01% to 0.50%.

(3) In the steel sheet with strain induced transformation type composite structure according to (1) or (2), the chemical composition may include, by mass %, one or more selected from the group consisting of Mg: 0.0005% to 0.0100%, Ca: 0.0005% to 0.0100%, and REM: 0.0005% to 0.100%.

(4) In the steel sheet with strain induced transformation type composite structure according to any one of (1) to (3), the chemical composition may include, by mass %, B: 0.0002% to 0.0020%.

(5) The steel sheet with strain induced transformation type composite structure according to any one of (1) to (4) may further include a galvanized layer on a surface.

(6) According to another aspect of the present invention, there is provided a method of manufacturing a steel sheet with strain induced transformation type composite structure, the method icludes: a heating process of heating a slab having the chemical composition according to any one of (1) to (4) to SRTmin (° C.), which is defined by the following equation (iv), or higher; a rough rolling process to obtain a rough bar in which one pass or more of rolling with 20% or higher of a rolling reduction is performed on the slab in a first temperature range from 950° C. to 1,050° C. with 60% to 90% of total rolling reduction after the heating process; a finish rolling process to obtain a steel sheet in which finish rolling is performed on the rough bar, in which the finish rolling process starts in a second temperature range of 930° C. or higher and lower than 1,000° C. within 150 seconds after the rough rolling and ends in a third temperature range from an $Ar_3$ transformation point, which is expressed by the following equation (x), to the $Ar_3$ transformation point +80° C.; and a cooling process of performing a first cooling, a second cooling, a third cooling and an winding, in which the steel sheet is cooled to a fourth temperature range of 600° C. or more and lower than the $Ar_3$ transformation point within 3 seconds after the finish rolling process at an average cooling rate of 15° C./s or faster in the first cooling, the steel sheet is cooled from the fourth temperature range to a fifth temperature range of higher than 600° C. and 700° C. or lower at the average cooling rate of 10° C./s or slower in a time of 1 second or longer and shorter than 10 seconds in the second cooling, the steel sheet is cooled from the fifth temperature range to a sixth temperature range of higher than 350° C. and 450° C. or lower at a cooling rate of 15° C./s or faster in the third cooling, and the steel sheet is wound in the sixth temperature range in the winding, in the finish rolling process, at least two passes of rolling is performed with 75% to 95% of the total rolling reduction, and in the cooling process, a total cumulative diffusion length Ltotal (μm) of Ti in the polygonal ferrite expressed by the following equation (vii) satisfies the following equation (v), $$SRTmin=7,000/\{2.75-\log_{10}(Ti \times C)\}-273 \quad (iv)$$

$$Ar_3=910-310 \times C+25 \times (Si+2\times Al)-80\times Mneq \quad (x)$$

where symbols for elements in the equations are amounts of the elements included in the steel sheet by mass %, Mneq is expressed by the following equation (xi) in a case where B is not included in the steel sheet and is expressed by the following equation (xii) in a case where B is included in the steel sheet, $$Mneq=Mn+Cr+Cu+Mo+Ni/2+10\times(Nb-0.02) \quad (xi)$$

$$Mneq=Mn+Cr+Cu+Mo+Ni/2+10\times(Nb-0.02)+1 \quad (xii)$$

$$0.15 \leq Ltotal \leq 0.4 \quad (v)$$

$$Ltotal=\Sigma(\sqrt{D\times(T+273)\times \Delta t}) \quad (vii)$$

where, $D\times(T+273)$ in the equation (vii) indicates a body diffusion coefficient at T° C. in μm²/s and is expressed using a diffusion coefficient $D_0$ of Ti in μm²/s, activation energy Q in kJ/mol, and a gas constant R in kJ/mol·K as shown in the following equation (viii), and Δt is an infinitesimal difference of time from the third cooling to the winding.

$$D\times(T+273)=D_0\times Exp(-Q/R\times(T+273)) \quad (viii)$$

(7) In the method of manufacturing a steel sheet with strain induced transformation type composite structure according to (6), in the rough rolling process, at least two passes of rolling may be performed and the total rolling reduction may be 60% to 90%.

(8) The method of manufacturing a steel sheet with strain induced transformation type composite structure according to (6) or (7) may further include a galvanizing process of galvanizing the steel sheet by immersing the steel sheet into a galvanizing bath after the cooling process.

(9) The method of manufacturing a steel sheet with strain induced transformation type composite structure according to (8) may further include an alloying treatment process of performing an alloying treatment on the steel sheet by heating the steel sheet to a temperature range from 450° C. to 600° C. after the galvanizing process.

EFFECTS OF THE INVENTION

According to the aspects of the present invention, it is possible to obtain a high-strength steel sheet with strain induced transformation type composite structure having tensile strength of 540 MPa or greater while being excellent in strength elongation balance, hole expansibility, corrosion resistance, and notch fatigue properties and also being excellent in surface properties at the same time. The steel sheet with strain induced transformation type composite structure can be preferably used as a steel sheet for a wheel disk or the like.

BRIEF DESCRIPTION OF THE DRAWINGS

FIG. 2 is a flow chart illustrating an example of a method of manufacturing a steel sheet with strain induced transformation type composite structure according to the present embodiment.

EMBODIMENT OF THE INVENTION

Figure 1:
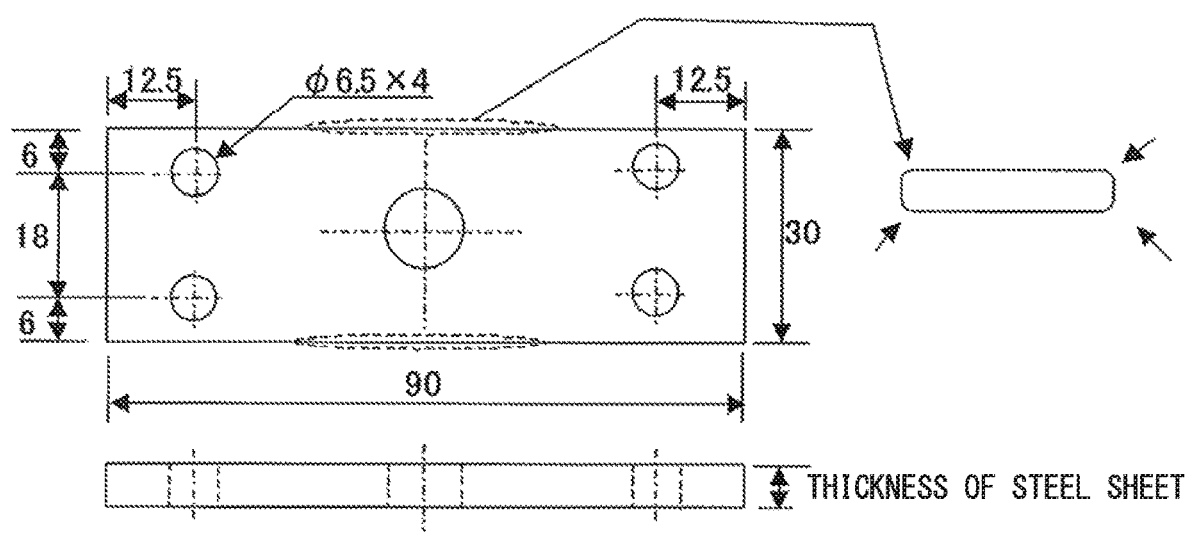
FIG. 1 is a view illustrating a shape of a notch fatigue test piece.

A steel sheet with strain induced transformation type composite structure according to an embodiment of the present invention (hereinafter, will be sometimes called a steel sheet according to the present embodiment) has the following features (a) to (f).

(a) As a chemical composition, by mass %, C: more than 0.075% and 0.150% or less, Si: 0.50% or less, Mn: 0.20% to 3.00%, P: 0.010% or less, S: 0.005% or less, Al: 0.040% to 1.500%, N: 0.0100% or less, Ti: 0.015% to 0.200%, Nb: 0% to 0.060%, Cu: 0% to 1.20%, Ni: 0% to 0.60%, Mo: 0% to 1.00%, V: 0% to 0.200%, Cr: 0% to 2.00%, W: 0% to 0.50%, Mg: 0% to 0.0100%, Ca: 0% to 0.0100%, REM: 0% to 0.100%, B: 0% to 0.0020%, and a remainder including Fe and impurities are included, and the following equation (i) is satisfied.

$$Ti-48\times(N/14+S/32) \geq 0 \quad (i)$$

(b) A microstructure at the ¼ thickness of the steel sheet, by area ratio, includes 50% to 85% of polygonal ferrite, 3% to 10% of residual austenite, 5% to 47% of bainite, and 1% or less of fresh martensite and tempered martensite in total, and satisfies the following equation (ii).

$$0.01<Ex.C/fsd \leq 0.015 \quad (ii)$$

(c) $1\times10^{16}$ pieces/cm³ or more of precipitate containing TiC are contained in the structure.

(d) The residual austenite has an average grain diameter of the residual austenite is 1.0 μm to 5.0 μm at an equivalent circle diameter.

(e) An average of closest distances of the austenite is 3.0 µm to 10.0 µm.

(f) An average diameter of the precipitates is 3 nm or less.

In the features described above, symbols for elements in the equations are amounts of the elements included in the steel sheet by mass %, the fsd in the equation (ii) is an area ratio (%) of the residual austenite in the microstructure, and Ex.C is calculated by the following equation (iii) using an amount of each element by mass %.

$$\text{Ex.C}=C-12\times(\text{Ti}/48+\text{Nb}/93-N/14-S/32) \quad \text{(iii)}$$

Hereinafter, the steel sheet according to the present embodiment will be described in detail.

1. Chemical Composition

First, the reasons for limiting the chemical composition will be described. In the description below, "%" for the content denotes "mass %".

<C: More than 0.075% and 0.150% or Less>

C is an element which generates residual austenite and contributes to improvement of strength elongation balance (TS×El) due to transformation induced plasticity. In addition, C is an element which forms a precipitate with Ti and contributes to improvement of the strength due to precipitation strengthening. Therefore, C is an important element. If the C content is 0.075% or less, strength of 540 MPa or greater cannot be obtained. In addition, if the C content is 0.075% or less, an improvement effect of ductility (elongation) due to ensuring residual austenite cannot be obtained. Meanwhile, if the C content exceeds 0.150%, the area ratio of residual austenite exceeds 10%, and hole expansibility is thereby degraded. Therefore, the C content is set to be more than 0.075% and 0.150% or less.

<Si: 0.50% or Less>

Si is also one of important elements in the present embodiment. Si is a deoxidizing element. At the same time, Si is an element which enlarges a temperature range of a dual phase region of ferrite and austenite by enlarging a ferrite region temperature to a high-temperature side in accordance with an increase of its content. Therefore, in order to obtain steel with a strain induced transformation composite structure, it is desirably essential that Si is included.

However, Si noticeably causes a tiger-striped Si scale pattern on a surface of a steel sheet so that the surface properties remarkably deteriorate. Moreover, Si sometimes causes productivity of a scale removing process (pickling and the like) in a precise line to be extremely degraded. If the Si content exceeds 0.50%, the surface properties remarkably deteriorate, and productivity of the pickling process is extremely worsened. In addition, in spite of execution of every possible scale removing methods, chemical convertibility deteriorates and corrosion resistance after coating is degraded. Therefore, the Si content is set to 0.50% or less. In order to prevent occurrence of the Si scale pattern, the Si content is desirably set to 0.10% or less, more desirably set to 0.07% or less, and further more desirably set to 0.05% or less.

Meanwhile, Si is an element having an effect of suppressing generation of scale-caused defects, such as scale and spindle scale. The effect can be obtained in a case where the Si content is 0.02% or more. Therefore, the lower limit for the Si content may be set to 0.02%.

<Mn: 0.20% to 3.00%>

Mn is an element which contributes to strengthening of ferrite. In addition, Mn is an element which enlarges the temperature range of the dual phase region of ferrite and austenite by enlarging an austenite region temperature to a low-temperature side in accordance with an increase of its content. If the temperature range of the dual phase region is enlarged, dual-phase separation of ferrite and austenite is likely to occur during cooling after finish rolling. Accordingly, it is advantageous for obtaining steel with a strain induced transformation composite structure. In order to achieve the effects, the Mn content is set to 0.20% or more. Meanwhile, if the Mn content exceeds 3.00%, a slab crack is noticeably generated during casting. Therefore, the Mn content is set to 3.00% or less.

In addition, if Mn is included more than 2.50%, hardenability increases excessively. Accordingly, in order to obtain an intended microstructure, air cooling and holding are required to be carried out for a long time for causing ferrite to be precipitated during cooling after finish rolling, and there are cases where productivity is degraded. Therefore, the Mn content is desirably set to 2.50% or less and is more desirably set to 2.20% or less.

Meanwhile, in order to suppress generation of a hot crack caused due to S, it is desirable that the Mn content and the S content satisfy Mn/S>20. Symbols for elements in the equations indicate amounts of the elements (by mass %) included in the steel sheet.

<P: 0.010% or Less>

P is an impurity element. If the P content exceeds 0.010%, segregation to the crystal grain boundary becomes noticeable. In this case, intergranular embrittlement is induced, so that local ductility deteriorates and notch fatigue properties are degraded. In addition, embrittlement of a weld also becomes noticeable. Therefore, the P content is set to 0.010% or less. It is desirable to have less P content, but the lower limit is not particularly set for the P content. However, if the P content is set to be less than 0.0001%, the manufacturing cost increases remarkably, and it is economically disadvantageous. Therefore, the P content may be set to 0.0001% or more.

<S: 0.005% or Less>

S is an impurity element. S adversely affects weldability and manufacturability during casting and during hot rolling. In addition, S forms coarse MnS in a steel sheet, so that hole expansibility is degraded. If the S content exceeds 0.005%, its influence becomes noticeably. Therefore, the S content is set to 0.005% or less. It is desirable to have less S content, but the lower limit is not particularly set for the S content. However, setting the S content to be less than 0.0001% is economically disadvantageous. Therefore, the S content may be set to 0.0001% or more.

<Al: 0.040% to 1.500%>

Al is a deoxidizing element. At the same time, similar to Si, Al is an element which enlarges the temperature range of the dual phase region of ferrite and austenite by enlarging a ferrite region temperature to a high-temperature side in accordance with an increase of its content. Therefore, Al is one of important elements in the present embodiment. In order to achieve the effects, the Al content is set to 0.040% or more. Meanwhile, if the Al content exceeds 1.500%, the ferrite region temperature is excessively enlarged to the high-temperature side, it is difficult to end finish rolling in an austenite region. In this case, processed ferrite remains in a steel sheet which is a product, so that ductility and hole expansibility deteriorate. In addition, if the Al content exceeds 1.500%, there is also a possibility that a tundish nozzle will be likely to be clogged during casting. Therefore, the Al content is set to 1.500% or less. However, if the Al content exceeds 1.000%, a non-metal inclusion such as alumina increases, and there are cases where local ductility deteriorates. Therefore, it is desirable that the Al content is 1.000% or less.

<N: 0.0100% or Less>

N is an impurity which is unavoidably incorporated during refining of steel. In addition, N is an element which is bonded to Ti, Nb, and the like and forms a nitride. If the N content exceeds 0.0100%, nitrides are likely to be coarsely precipitated at a relatively high temperature. Accordingly, there is a possibility that a coarse nitride will become a starting point of a crack during burring. Therefore, the N content is set to 0.0100% or less. In addition, if N forms a nitride with Ti and Nb, the effects of Nb and Ti (will be described below) are reduced. Therefore, in order to effectively utilize Ti and Nb, it is desirable to have less N content.

If the N content exceeds 0.0060%, aging deterioration becomes is violently caused. Therefore, in a case of suppressing the aging deterioration, it is desirable that the N content is set to 0.0060% or less. Moreover, in a case where the steel sheet according to the present embodiment is applied to a member on the premise that the member is processed after being left behind at room temperature for two weeks or longer after being manufactured, it is more desirable that the N content is set to 0.0050% or less from the viewpoint of countermeasures for the aging deterioration. In addition, in consideration of use while being left behind under a high-temperature environment in summer or while being under an environment involved in export on a ship or the like to a low latitude area, it is further more desirable that the N content is less than 0.0040%.

<Ti: 0.015% to 0.200%>

Ti is one of important elements in the steel sheet according to the present embodiment. Ti is precipitated as TiN in the austenite region during hot rolling and contributes to refining the grain diameter of austenite. In addition, when ferritic transformation is in progress during cooling after hot rolling ends, the remaining Ti is minutely precipitated as carbides such as TiC at the same time. Due to the grain diameter of austenite refined by means of TiN precipitation and carbides such as TiC caused precipitation strengthening of ferrite grains, the strength is improved. In order to achieve these effects, the Ti content is required to be set to 0.015% or more. Meanwhile, even if the Ti content exceeds 0.200%, the effects are saturated. Furthermore, Ti carbides or Ti carbosulfides are also precipitated in the austenite region. Accordingly, the solid-soluted C is reduced, and it is thereby difficult to obtain a desired metallographic microstructure after transformation. Therefore, the Ti content is set to 0.200% or less. In addition, if the Ti content exceeds 0.150%, there are cases where the tundish nozzle is likely to be clogged during casting. Therefore, it is desirable that the Ti content is set to 0.150% or less.

In addition, in order to achieve the effects, the Ti content is required to satisfy the following equation (i) in the relationship between the N content and the S content.

$$\text{Ti}-48\times(\text{N}/14+\text{S}/32)\geq 0 \qquad (i)$$

If the equation (i) is less than zero, since Ti which can be precipitated as TiC is no longer present, precipitation strengthening cannot be achieved.

Symbols for elements in the equations indicate amounts of the elements (by mass %) included in the steel sheet.

Basically, the steel sheet according to the present embodiment includes the chemical elements described above and has the remainder including Fe and impurities. However, in order to further enhance the strength and hole expansibility, in place of a part of Fe, one or more selected from the group consisting of Nb, Cu, Ni, Mo, V, Cr, and W may be included within the ranges described below. However, since these elements are not necessarily included, their lower limits are 0%. Here, "impurities" denotes elements incorporated due to raw materials such as ore and scrap, and various factors in manufacturing processes when steel is manufactured on an industrial scale. The impurities are allowed within a range not adversely affecting the present invention.

<Nb: 0% to 0.060%>
<Cu: 0% to 1.20%>
<Ni: 0% to 0.60%>
<Mo: 0% to 1.00%>
<V: 0% to 0.200%>
<Cr: 0% to 2.00%>
<W: 0% to 0.50%>

Nb, Cu, Ni, Mo, V, Cr, and W are elements having an effect of improving the strength of a steel sheet by means of precipitation strengthening or solid-soluted strengthening. Therefore, one or more selected from the group consisting of these elements may be included as necessary. In order to achieve the effects, it is desirable to include one or more selected from the group consisting of Nb: 0.005% to 0.060%, Cu: 0.02% to 1.20%, Ni: 0.01% to 0.60%, Mo: 0.01% to 1.00%, V: 0.01% to 0.200%, Cr: 0.01% to 2.00%, and W: 0.01% to 0.50%.

Meanwhile, even though these elements are included in surplus, the effects are saturated, so that economic efficiency is degraded. Therefore, even in a case where the elements are included, the Nb content is set to 0.060% or less, the Cu content is set to 1.20% or less, the Ni content is set to 0.60% or less, the Mo content is set to 1.00% or less, the V content is set to 0.200% or less, the Cr content is set to 2.00% or less, and the W content is set to 0.50% or less.

<Mg: 0% to 0.0100%>
<Ca: 0% to 0.0100%>
<REM: 0% to 0.100%>

Mg, Ca, and REM (rare earth element) are elements controlling the form of a non-metal inclusion which becomes a starting point of fracture and causes deterioration of ductility and hole expansibility, and improving workability of a steel sheet. Therefore, one or more selected from the group consisting of these elements may be included as necessary. In order to achieve the effects, it is desirable to include one or more selected from the group consisting of Mg: 0.0005% to 0.0100%, Ca: 0.0005% to 0.0100%, and REM: 0.0005% to 0.100%. Meanwhile, even though these elements are included in surplus, the effects are saturated, so that economic efficiency is degraded. Therefore, even in a case where the elements are included, the Mg content is set to 0.0100% or less, the Ca content is set to 0.0100% or less, and the REM content is set to 0.100% or less. The REM denotes 17 elements in which Y and Sc are added to 15 elements of lanthanoid. The REM content denotes the total amount of these elements.

<B: 0% to 0.0020%>

B is an element which enhances hardenability of steel and has an effect of increasing the microstructure fraction of residual austenite. In order to achieve the effects, the B content may be set to 0.0002% or more. It is more desirable that the B content is set to 0.0010% or more. Meanwhile, if the B content is included in surplus, the effects are saturated, so that economic efficiency is degraded. Therefore, even in a case where the B content is included, the B content is set to 0.0020% or less. In addition, B is an element causing a slab crack in a cooling process after continuous casting. Therefore, from that viewpoint, it is desirable that the B content is set to 0.0015% or less.

Even though the steel sheet according to the present embodiment of the invention includes 1.0% or less of Zr, Sn, Co, and Zn in total as impurity elements, the effects are not ruined. However, if a large amount of Sn is included, there is a possibility that defects will be caused during hot rolling. Therefore, it is desirable that the Sn content is set to 0.05% or less.

2. Microstructure

Next, the structure (microstructure) of the steel sheet according to the present embodiment will be described. The microstructure of the steel sheet according to the present embodiment is a microstructure at the ¼ thickness of the steel sheet at which a representative microstructure is assumed to be obtained (position of ¼ the sheet thickness from the surface in the sheet thickness direction).

<By area ratio, 50% to 85% of polygonal ferrite, 3% to 10% of residual austenite, 5% to 47% of bainite and bainitic ferrite in total, and 1% or less of fresh martensite and tempered martensite in total are included, and 0.01<Ex.C/fsd≤0.015 is satisfied>

Polygonal ferrite is a microstructure which is important in ensuring elongation. In ferrite, compared to bainitic ferrite having high dislocation density, polygonal ferrite having low dislocation density and being excellent in ductility contributes to improvement of elongation. Therefore, in order to achieve excellent elongation, the area ratio of polygonal ferrite is set to 50% or more. Meanwhile, if polygonal ferrite exceeds 85%, it is difficult to ensure the strength. Therefore, the area ratio of polygonal ferrite is set to 85% or less.

Polygonal ferrite generated by means of a diffusive mechanism has no internal structure in grains, and the grain boundary is linear or is on an arc. Meanwhile, bainitic ferrite and bainite have an internal structure, have an acicular intergranular shape, and have a structure clearly different from that of polygonal ferrite. Therefore, polygonal ferrite, bainite, and bainitic ferrite can be determined based on the intergranular shape and the presence or absence of the internal structure from a photograph of the microstructure obtained by using an optical microscope after etching performed with nital. In a case where the internal structure does not clearly appear and a microstructure having an acicular intergranular shape (pseudopolygonal ferrite) is present, it is counted as bainitic ferrite.

There are cases where a steel sheet is subjected to rolling after ferrite is generated, such as cases where the hot rolling temperature is excessively low. Ferrite which has been subjected to such processing is discriminated from polygonal ferrite, as processed ferrite. Processed ferrite has a linear intergranular shape and has a shape elongated in a rolling direction during rolling. Accordingly, the microstructure can be distinguished from others such as polygonal ferrite. In the present embodiment, regardless of the presence or absence of the internal structure, in a case where the intergranular shape is linear, and the aspect ratio of the maximum length of a crystal grain in the rolling direction and the maximum length in the sheet thickness direction is 4 or greater, it is counted as processed ferrite.

Residual austenite is an important microstructure for exhibiting excellent elongation by means of transformation induced plasticity (TRIP). If the area ratio of residual austenite dispersed in an island shape becomes less than 3%, it is difficult to ensure sufficient elongation. In addition, an effect of delaying propagation of a fatigue crack vanishes. Meanwhile, if the area ratio of residual austenite exceeds 10%, a gap, which is assumed to be a generation site of a void between pieces of full hard martensite which is generated from residual austenite by means of strain induced transformation, is shortened, so that voids are likely to be joined. In this case, the joined voids are likely to lead to ductile fracture, so that hole expansibility deteriorates. Therefore, the area ratio of residual austenite is set to 3% to 10%.

The steel sheet according to the present embodiment, by area ratio, includes 5% to 47% of bainite. If bainite is less than 5%, the concentration of C with respect to austenite is insufficient, so that it is difficult to ensure residual austenite. Therefore, the lower limit for the area ratio of bainite is set to 5%. From that viewpoint, it is preferable that the area ratio of bainite is 10% or more. Meanwhile, if bainite exceeds 47%, ductility is degraded. Therefore, the upper limit for the area ratio of bainite is set to 47%. From that viewpoint, it is desirable that the area ratio of bainite is 40% or less.

In the steel sheet according to the present embodiment, it is allowed to include less than 1% of fresh martensite (M) and tempered martensite (tM) in total. If fresh martensite and tempered martensite exceed 1% in total, hole expansibility deteriorates. Martensite and tempered martensite may be 0%.

In the steel sheet according to the present embodiment, in addition to polygonal ferrite, residual austenite, bainite, bainitic ferrite, fresh martensite, and tempered martensite, even though other microstructures (for example, pearlite and processed ferrite) are additionally included, the effects are not ruined as long as the area ratio is 1% or less.

Here, processed ferrite indicates a state where polygonal ferrite is subjected to rolling, is elongated in the rolling direction, and includes dislocation introduced into grains due to the processing, when the hot rolling is carried out at a temperature of an $Ar_a$ transformation point or lower.

In the present embodiment, bainite indicates bainite (aB) which includes no coarse carbides between laths. This is a characteristic microstructure in a case where carbon is discharged to austenite during bainitic transformation and sufficiently stable residual austenite is included at room temperature.

Each of the microstructures can be determined as follows. That is, the microstructure fraction (area ratio) can be obtained by the method described below. First, a sample collected from a hot rolled steel sheet is subjected to etching with nital. An image analysis is performed with respect to a photograph of the structure obtained in the visual field of 300 μm×300 μm at a position ¼ depth of the sheet thickness by using an optical microscope after etching, thereby obtaining the area ratio of polygonal ferrite, processed ferrite, and pearlite, and the total area ratio of bainite and martensite. Subsequently, an image analysis is performed with respect to a photograph of the microstructure obtained in the visual field of 300 μm×300 μm at a position ¼ depth of the sheet thickness, by employing a Le Pera corrosion-sample and using an optical microscope, thereby calculating the total area ratio of residual austenite and martensite.

Moreover, the volume percentage of residual austenite is obtained through the below-described method by means of X-ray diffraction measurement using a sample which is faced to ¼ depth of the sheet thickness in the normal direction of a rolled surface. That is, its volume percentage is conveniently obtained based on the strength difference between the reflection surfaces of austenite and ferrite by the following Equation (ix) using the Kα line of Mo.

$$V\gamma=(2/3)\times\{100/(0.7\times\alpha(211)/\gamma(220)+1)\}+(1/3)\times\{100/(0.78\times\alpha(211)/\gamma(311)+1)\} \quad (ix)$$

However, each of α(211), γ(220), and γ(311) is the strength of an X-ray reflection surface of ferrite (α) and austenite (γ).

Since the volume percentage of residual austenite is equivalent to the area ratio of residual austenite, it is used as the area ratio of residual austenite.

According to the method, it is possible to obtain each area ratio of polygonal ferrite, processed ferrite, bainite, martensite, residual austenite, and pearlite.

In regard to the volume percentage of residual austenite, it is possible to obtain a substantially consistent value using any method of an optical microscope observation and an X-ray diffraction method. Therefore, any measurement value may be used.

<Number Density of Precipitate Containing TiC: $1 \times 10^{16}$ pieces/$cm^3$>

<Average diameter of Precipitate: 3 nm or smaller>

Meanwhile, in a case where polygonal ferrite has the area ratio described above and the area ratio of residual austenite is 10% or less, in order to achieve tensile strength of 540 MPa or greater, the structure is required to be strengthened by means of precipitation strengthening. That is, polygonal ferrite is required to be subjected to precipitation strengthening by means of Ti carbides.

In addition, if the component is uniform, the average diameter (equivalent circle diameter) and the density of a precipitate containing TiC has a relationship of a substantially inverse correlation. In the present embodiment, in order to achieve a strength increase of 100 MPa or greater in tensile strength by means of precipitation strengthening, the average diameter of a precipitate containing TiC is set to 3 nm or smaller in the equivalent circle diameter, and its density is set to $1 \times 10^{16}$ pieces/$cm^3$ or more.

If the average diameter of a precipitate containing TiC exceeds 3 nm, contribution to precipitation strengthening is insufficient. In addition, even if the number density is less than $1 \times 10^{16}$ pieces/$cm^3$, the effect is insufficient for precipitation strengthening.

The average diameter of a precipitate containing TiC, and the number density can be measured by the below-described method.

A needle-shaped sample is prepared from a hot rolled steel sheet by performing cutting and an electrolytic polishing method. In this case, as necessary, a focused ion beam processing method may be utilized together with the electrolytic polishing method. A three-dimensional distribution image of composite carbonitrides is acquired from this needle-shaped sample by the three-dimensional atom probe measurement method.

According to the three-dimensional atom probe measurement method, it is possible to acquire a three-dimensional distribution image of real atoms in a real space by reconstructing integrated data. When the grain diameter of a precipitate containing TiC is measured, the diameter of the precipitate assumed to be a sphere is obtained based on the number of constituent atoms and its lattice constant of the precipitate which is an observation subject, and the obtained diameter is defined as the grain diameter of the precipitate containing TiC.

In the present embodiment, among the precipitates containing TiC, precipitates having a grain diameter of 3 nm or smaller are counted. The lower limit for the grain diameter is not particularly limited. However, in a case where the grain diameter is less than 0.5 nm, since the grain diameter becomes smaller than the lattice constant of TiC, it is not counted as a precipitate. The number density (pieces/$cm^3$) is obtained based on the number of precipitates containing measured TiC.

<Average grain diameter of Residual austenite (Circle Equivalent Diameter): 1.0 μm to 5.0 μm>

<Average Value of Distances of Closest Distances of Residual austenite: 3.0 μm to 10.0 μm>

<0.01<Ex.C/fsd≤0.015>

A hole expansion test has been proposed as a test method in which the difference of burring or hole expansibility is plainly indicated. A hole expansion value which can be obtained in this test is widely used as an index for evaluating local deformability. The occurrence and the progress of a crack in hole expansion processing are caused due to ductile fracture having generation, growth, and joining of voids as the elementary step. In a case where the strength difference between microstructures is significant as in TRIP steel, high concentration of strain and stress occurs due to relatively full hard residual austenite or full hard martensite resulted due to strain induced transformation of residual austenite. Therefore, generally, a void is likely to be generated and grow, and the hole expansion value is low. However, the inventors have found that generation, growth, and joining of voids can be delayed by controlling the size and the dispersion state of residual austenite and hole expansibility can be thereby improved.

It is assumed that the ductile fracture assumed to be related to hole expansibility is caused due to occurrence of voids, and growth and joining subsequent thereto. In addition, it is assumed that a generation site of a void is full hard martensite generated from residual austenite by means of strain-induced transformation. Therefore, it is assumed that if the shape of residual austenite is an island shape, stress concentration is relaxed and occurrence of a void from martensite after transformation is suppressed. The island shape not only indicates a state where pieces of residual austenite are not arranged in an array shape in a joined manner, but also includes that the shape of each piece is a shape close to a sphere in which locations of stress concentration are minimized. It is desirable that pieces of residual austenite are dispersed in an island shape on corners, edges, and intergranular surfaces of ferrite grains or bainite grains.

The inventors have found that an excellent hole expansion value can be obtained through a delay of generation, growth, and joining of voids achieved by satisfying the following equation (ii) and optimizing the dispersion state, hardness, and the like of residual austenite. In addition, it is found that as the progress of a fatigue crack stops or detours, the propagation velocity of the fatigue crack drops so that excellent notch fatigue strength can be achieved.

$$0.01 < \text{Ex.C}/fsd \leq 0.015 \quad \text{(ii)}$$

Ex.C in the equation (ii) is a value defined by the following equation (iii), and fsd indicates the area ratio (%) of residual austenite in a microstructure.

$$\text{Ex.C} = C - 12 \times (Ti/48 + Nb/93 - N/14 - S/32) \quad \text{(iii)}$$

Here, symbols for elements in the equation (iii) indicate amounts of the elements (by mass %) included in the steel sheet.

In addition, in the steel sheet according to the present embodiment, the average grain diameter of residual austenite (circle equivalent diameter) is 1.0 μm to 5.0 μm. If the average grain diameter of residual austenite is less than 1.0 μm, the size is not an obstacle for propagation of a fatigue crack, so that it is not possible to obtain an effect of delaying the propagation velocity of a crack. Meanwhile, if the average grain diameter exceeds 5.0 μm, the shape becomes complicated inevitably, and stress concentration occurs. In this case, fracture of full hard martensite, which is generated from coarse residual austenite by means of strain induced transformation, occurs in an early stage generate, and this local ductile fracture caused due to the occurrence of a void adversely affects the hole expansibility. It is desirable that the average grain diameter of residual austenite is 3.0 μm or smaller. If residual austenite has a small size so that the number of pieces per unit volume decreases, residual austenite itself that is a generation site of a void, or the boundary between ferrite and residual austenite and boundary between bainite and residual austenite are reduced. Accordingly, occurrence of a void is suppressed, and a gap between pieces of residual austenite is widened. Therefore, voids are unlikely to be joined so that growth of a void is suppressed.

The average grain diameter of residual austenite can be obtained through an image analysis from an optical microscopic photograph at a magnification of 500 etched with a Le Pera reagent.

Moreover, in the steel sheet according to the present embodiment, an average value of distances of closest distances of residual austenite is 3.0 μm to 10.0 μm. In the present embodiment, the average value of distances of closest distances of residual austenite is a value obtained by measuring the distances at 20 points from arbitrarily selected residual austenite to the closest residual austenite and calculating the average value thereof. If the average value of distances of closest distances of residual austenite is less than 3.0 μm, a gap between pieces of full hard martensite generated from residual austenite by means of strain induced transformation is shortened so that voids are likely to be joined. In this case, the joined voids are likely to lead to ductile fracture, so that hole expansibility deteriorates. Meanwhile, if the average value of distances of closest distances of residual austenite exceeds 10.0 μm, a fatigue crack is selectively propagated through soft polygonal ferrite, so that the effect of delaying propagation of a fatigue crack is ruined.

It is desirable that the average nano hardness of residual austenite is 7 GPa to 14 GPa. If residual austenite is limited to a hardness range, local occurrence of a void in an early stage of deformation can be prevented, and uneven growth of voids is suppressed. In a case where the average nano hardness is less than 7 GPa, residual austenite becomes unstable thermodynamically, so that strain induced transformation occurs in a very early stage of deformation. Accordingly, there are cases where excellent uniform elongation which is the feature of steel with a strain induced transformation composite structure is no longer exhibited. Meanwhile, if the average nano hardness exceeds 14 GPa, the hardness difference between residual austenite and soft polygonal ferrite, or the hardness difference between martensite generated from residual austenite by means of strain induced transformation and soft polygonal ferrite increases. In this case, ductile fracture is likely to progress due to local occurrence of voids from the early stage to the later stage of deformation, and there is concern that local deformability will be degraded. It is more desirable that the average nano hardness of residual austenite is 12 GPa or lower. In addition, if the range of nano hardness is 1.5 GPa or lower at the standard deviation, local occurrence of a void in an early stage of deformation is desirably suppressed.

For example, nano hardness of residual austenite can be measured using Triboscope/Triboindenter manufactured by Hysitron, Inc. Hardness of residual austenite having 20 points or more in load of 1 mN is measured, and then the average nano hardness and the standard deviation of residual austenite can be calculated from the result.

The steel sheet according to the present embodiment may have a known galvanized layer on its surface. The galvanized layer may be a hot-dip galvanized layer or a galvannealed layer. In a case where the galvanized layer is included, since occurrence of rust is suppressed, corrosion resistance of a steel sheet is improved.

3. Manufacturing Method

The method of manufacturing a steel sheet according to the present embodiment (steel sheet with strain induced transformation type composite structure) is not limited. As long as a steel sheet has the features described above, the same effect can be achieved. However, for example, an optimal metallographic microstructure can be achieved with reproducibility by using a manufacturing method including a heating process, a rough rolling process, a finish rolling process, and a cooling process as described below.

Hereinafter, preferable conditions for each of the processes will be described.

In a method of manufacturing a steel sheet according to the present embodiment, a method of manufacturing a steel piece having the above-described chemical composition, performed prior to hot rolling, is not particularly limited. The method of manufacturing a steel piece may be performed as follows. In accordance with an ordinary method, smelting is carried out using a blast furnace, a converter furnace, an electric furnace, or the like. An adjustment of chemical composition is performed through various secondary refining processes such that the intended chemical composition is obtained. Subsequently, a casting process is performed through a method of thin slab casting, in addition to ordinary continuous casting and casting by means of an ingot method. Scraps may be used as a raw material. In addition, in a case where a slab is obtained through continuous casting, the slab may be directly fed to a hot roller as high-temperature bloom or may be subjected to hot rolling after being reheated in a heating furnace after being cooled to the room temperature.

<Heating Process>

In the heating process, a slab obtained through casting or the like is heated before hot rolling. The slab is heated in a heating furnace at the heating temperature which is a minimum slab reheating temperature (SRTmin)° C. calculated based on the following equation (iv) or higher and 1,350° C. or lower.

$$SRTmin=7,000/\{2.75-\log_{10}(Ti \times C)\}-273 \quad (iv)$$

However, symbols for elements in the equation indicate amounts of the elements (by mass %) included in the steel sheet.

If the heating temperature is less than the SRTmin (° C.), carbonitrides of Ti generated during the casting are not sufficiently dissolved in a base metal. In this case, Ti is not minutely precipitated as carbides during cooling performed after ending of finish rolling, or after winding, so that it is not possible to achieve an effect of improving strength utilizing precipitation strengthening. Therefore, the heating temperature in the heating process is set to the SRTmin (° C.) or higher. In addition, if the heating temperature is less than 1,100° C., the operational efficiency in terms of a schedule is remarkably ruined. Accordingly, it is desirable that the heating temperature is 1,100° C. or higher.

Meanwhile, if the heating temperature exceeds 1,350° C., productivity is remarkably ruined and grain diameter of austenite becomes coarse, thereby causing degradation of toughness or hole expansibility. Therefore, the heating temperature is set to 1,350° C. or lower.

A heating time in the heating process is not particularly set. However, in order to cause dissolving of carbonitrides of Ti to progress sufficiently, it is desirable that the temperature is held for 30 min or longer after reaching the heating temperature described above. In addition, in a case where the slab is heated sufficiently and uniformly in the thickness direction, it is desirable that the heating temperature is held for 60 min or longer. Meanwhile, from the viewpoint of degradation of the yield due to the scale-off, it is desirable that the heating time is 240 min or shorter. However, the heating time is not limited thereto in a case where bloom after casting is directly fed and is rolled in a high-temperature state.

<Rough Rolling Process>

After the heating process, without any particular standby, a slab extracted in a heating furnace is subjected to rough rolling, thereby obtaining a rough bar. In this rough rolling process, one pass or more of rolling with 20% or higher of rolling reduction is performed in a temperature range from 950° C. to 1,050° C. (first temperature range). If the temperature of rough rolling is less than 950° C., hot deformation resistance in rough rolling increases, and there is a possibility that an operation of rough rolling will be hindered. Meanwhile, if the temperature of rough rolling exceeds 1,050° C., secondary scale generated during rough rolling grows excessively, and there is a possibility of difficulties in descaling or removing scale in finish rolling.

In addition, in rough rolling, if one or more pass of rolling with 20% or higher of the rolling reduction is not performed in the temperature range, it is not possible to expect resolution of anisotropy caused due to processing of austenite, crystal grain refining which is performed thereafter and utilizes recrystallization, and a solidification structure. In this case, the form of residual austenite changes from the island shape to a film shape, so that hole expansibility deteriorates. Particularly, in a case where bloom after casting is directly fed and is rolled in a high-temperature state, a casting structure remains, and there is a possibility that the form of residual austenite will be noticeably changed to a film shape.

As the number of rolling passes in the rough rolling process, if rolling is performed a plurality of passes, that is, two passes or more, processing of austenite and recrystallization is repeated, so that the average austenite grain before finish rolling is desirably refined to 100 μm or smaller. In a case where two passes or more of rolling is performed, the average grain diameter of residual austenite can be 5 μm or smaller stably. However, if the total rolling reduction of the plurality of passes is lower than 60%, it is not possible to sufficiently achieve the effect described on the above. Meanwhile, even if the total rolling reduction exceeds 90%, the effects are saturated. Furthermore, the number of passes increases. Accordingly, there is a possibility that productivity will be hindered and a temperature drop will be caused. In addition, based on a similar reason, it is desirable that the number of passes is 11 or smaller. The total rolling reduction is a percentage of the total reduction (difference between the inlet thickness before the first pass in rolling and an outlet sheet thickness after the last pass in rolling) with respect to a standard, that is, a standard based on the inlet thickness before the first pass. In addition, the total rolling reduction is individually calculated in each of rough rolling and finish rolling. That is, the total rolling reduction in rough rolling is a percentage of the difference between the inlet thickness before the first pass in rough rolling and the outlet sheet thickness after the last pass in rough rolling.

<Finish Rolling Process>

Finish rolling is performed after the rough rolling process ends. The time period from the end of rough rolling before the start of finish rolling is set to be within 150 seconds. If the time period exceeds 150 seconds, Ti in austenite is precipitated as carbides of coarse TiC in a rough bar, resulting in a decrease of TiC precipitated minutely in ferrite at the time of austenitic/ferritic transformation during the cooling process performed afterward, or at the time when ferritic transformation after winding is completed. Therefore, it is not possible to sufficiently achieve an effect of improving strength precipitation strengthening. In addition, growth of grains of austenite progresses and there are cases where the grain diameter of the average austenite grain before finish rolling becomes coarse beyond 100 μm and the average crystal grain diameter of residual austenite exceeds 5 μm.

Meanwhile, there is no need to particularly limit the lower limit value for the time period from the end of rough rolling before the start of finish rolling. However, if the time period is shorter than 30 seconds, the finish rolling starting temperature does not become lower than 1,000° C. unless a special cooling apparatus is used, so that a blister which becomes a starting point of scale, spindle scale defects, or the like is generated between pieces of the surface scale on the steel sheet which is the base metal before finish rolling and between the passes. In this case, the scale defects are likely to be generated. Therefore, it is desirable that the time period from the end of rough rolling before the start of finish rolling is set to 30 seconds or longer.

In the finish rolling process, the rolling starting temperature is set to 930° C. or higher and lower than 1,000° C. (second temperature range). If the finish rolling starting temperature is less than 930° C., Ti is precipitated as carbides of coarse TiC in austenite by means of strain induced precipitation. In this case, the precipitation results in a decrease of TiC precipitated minutely in ferrite at the time of austenitic/ferritic transformation during cooling performed afterward, or at the time when ferritic transformation after winding is completed, so that it is not possible to sufficiently achieve an effect of improving strength by means of precipitation strengthening. Meanwhile, if the finish rolling starting temperature is 1,000° C. or higher, a blister which becomes a starting point of scale or spindle scale defects is generated between pieces of the surface scale on the steel sheet which is the base metal before finish rolling and between the passes. Therefore, there is a possibility that the scale defects will be likely to be generated.

The finish rolling ending temperature is set to be a temperature range from the $Ar_3$ transformation point to the $Ar_3$ transformation point +80° C. (third temperature range). If the finish rolling ending temperature is lower than the $Ar_3$ transformation point, residual austenite in the microstructure of a finally obtained steel sheet is in a dispersion state of being arranged in an array shape in a joined manner instead of the island shape. In addition, the average value of distances of closest distances of residual austenite becomes less than 3 μm, so that hole expansibility deteriorates. Meanwhile, if the finish rolling ending temperature exceeds the $Ar_3$ transformation point +80° C., no matter how the cooling pattern after rolling is controlled, ferritic transformation is suppressed, and there is a possibility that residual austenite will be generated in surplus. In addition, residual austenite becomes unstable thermodynamically, strain induced transformation occurs in a very early stage of deformation, and there is a possibility that excellent elongation will not be able to be achieved.

The total rolling reduction of finish rolling is set to 75% to 95%. If the total rolling reduction is lower than 75%, the austenite grains cannot be sufficiently refined, the average grain diameter of residual austenite in the microstructure of a product version cannot be set to 5 μm or smaller. Meanwhile, if the total rolling reduction exceeds 95%, its effects are saturated. Furthermore, an excessive load is applied to a roller, and it is desirable in terms of an operation.

In finish rolling, a plurality of passes of rolling is performed (at least two passes). In a case where finish rolling is performed by a plurality of passes of rolling, unrecrystallization through rolling and recrystallization during an interpass time period before the next pass are repeated a plurality of times, and then the austenite grains are refined. Accordingly, the average grain diameter of residual austenite can be stably set to 5 μm or smaller. In addition, in a case where rolling is performed a plurality of passes, it is desirable to use a tandem roller.

Moreover, it is desirable that the rolling reduction in each pass is 10% or higher. Particularly, in last three passes of a finishing mill, if each rolling reduction is lower than 10% and the average rolling reduction is lower than 10%, growth of grains progresses remarkably between the rolling passes and after ending of finish rolling, and there are cases where the average grain diameter of residual austenite cannot be stably set to 5 μm or smaller.

In the present embodiment, the rolling speed is not particularly limited. However, if the rolling speed on the finishing final stand side is slower than 400 mpm, the time between the finish rolling passes is lengthened, so that the austenite grains grow coarse. In this case, there is a possibility that the average grain diameter of residual austenite will not be able to be stably set to 5 μm or smaller. Therefore, it is desirable that the rolling speed in finish rolling is set to 400 mpm or faster. Moreover, if the rolling speed is 650 mpm, the average grain diameter of residual austenite can be stably set to 5 μm or smaller, and it is more desirable. There is no need to particularly limit the upper limit for the rolling speed. However, the upper limit is practical to be 1,800 mpm or slower in terms of facility restriction.

<Cooling Process>

After ending of the finish rolling, a steel sheet is subjected to cooling optimized by controlling a run-out table and is wound. First, it is desirable that the time period before first cooling starts after finish rolling ends is set to be within 3 seconds. If the time period from the end of the finish rolling to the start of the first cooling exceeds 3 seconds, precipitation of carbonitrides of coarse and inconsistent Ti is in progress in austenite before transformation, and the precipitation amount of carbides including minute and consistent TiC to be precipitated in ferrite during cooling performed afterward is reduced, so that the strength is degraded. In addition, there is a possibility that the austenite grains will grow coarse and the average grain diameter of residual austenite in the microstructure of a production version will not be able to be set to 5 μm or smaller. There is no need to particularly limit the lower limit for the time period from the end of the finish rolling to the start of the first cooling. However, if the time period is shorter than 0.4 seconds, cooling is performed while the layer-structure processed in rolling remains as it is, and residual austenite arranged in an array shape in a joined manner can also be obtained in a product version, so that there is a possibility that hole expansibility will deteriorate. Therefore, it is desirable that the time period is set to 0.4 seconds or longer.

It is desirable that the cooling process performed after ending of the finish rolling process is a process including at least a first cooling, a second cooling, a third cooling, and an winding.

In the first cooling executed immediately after the finish rolling process, cooling is performed at a temperature lower than the $Ar_3$ transformation point (fourth temperature range) at the average cooling rate of 15° C./s or faster. If the average cooling rate is slower than 15° C./s, pearlite is generated during cooling, so that there is a possibility that the intended microstructure will not be able to be obtained. There is no need to particularly limit the upper limit for the cooling rate in the first cooling. However, it is extremely difficult to control the cooling stop temperature and to build a microstructure at the cooling rate exceeding 150° C./s. Therefore, it is desirable that the cooling rate is set to 150° C./s or slower.

In addition, if a cooling stop temperature is equal to or higher than the $Ar_3$ transformation point, there are cases where TiC cannot be minutely precipitated in ferrite at the time of austenitic/ferritic transformation in the subsequent second cooling. Meanwhile, in the present embodiment, there is no need to particularly limit the lower limit for the cooling stop temperature. However, as described below, in order to exhibit precipitation strengthening of ferrite, the second cooling stop temperature is set to a temperature exceeding 600° C. From this reason, if the first cooling stop temperature is 600° C. or lower, there is a possibility that precipitation strengthening will not be able to be obtained. In addition, if the cooling stop temperature drops to a Bs point (bainitic transformation start temperature) or lower, there is a possibility that ferrite or residual austenite cannot be obtained and the intended microstructure will not be able to be obtained.

In the second cooling subsequent to the first cooling, the steel sheet is cooled to higher than 600° C. and 700° C. or lower at the average cooling rate of 10° C./s or slower for a time of 1 second or longer and shorter than 100 seconds. When the cooling rate in the second cooling exceeds 10° C./s, there is a possibility that the moving speed of the boundary surfaces of these two phases becomes excessively fast at the time of transformation from austenite to ferrite, and precipitation of Ti carbides will not catch up the moving speed on the interphase boundary surfaces, so that sufficient precipitation strengthening cannot be achieved. In addition, transformation from austenite to ferrite is delayed, and there are cases where the intended microstructure cannot be obtained. Meanwhile, cooling performed within this temperature range aims to promote transformation from austenite to ferrite, to cause minute Ti carbides to be precipitated in ferrite, and to obtain the intended strength of the steel sheet. Therefore, there is no need to particularly limit the lower limit for the average cooling rate in the second cooling. In the present embodiment, air cooling (naturally cooling) is postulated as the second cooling.

Unless a heat input is carried out from outside using a heating apparatus or the like, even in a case of the sheet thickness of approximately half an inch, the cooling rate in air cooling is approximately 3° C./s.

The cooling time period in the second cooling is set to 1 second or longer and shorter than 100 seconds. The second cooling is an extremely important process for not only promoting dual-phase separation of ferrite and austenite and obtaining the intended second phase fraction, but also promoting precipitation strengthening by means of minute Ti carbides in ferrite of which transformation is completed. When the cooling time period is shorter than 1 second (or no second cooling is performed), ferritic transformation does not progress and the intended microstructure cannot be obtained. In addition, since precipitation of Ti carbides in ferrite after transformation does not progress, the intended strength and hole expansibility of the steel sheet cannot be obtained. In order to cause ferritic transformation and precipitation of carbides to progress sufficiently, it is desirable that the cooling time period is set to 3 seconds or longer. Meanwhile, in a case of 100 seconds or longer, the effects are saturated. Furthermore, productivity is remarkably degraded. Therefore, the cooling time period is set to shorter than 100 seconds. In a case where the cooling time period is 15 seconds or longer, the average grain diameter of residual austenite is likely to be coarse, and there is concern that pearlite is incorporated into the structure. Therefore, it is desirable that the cooling time period is set to shorter than 15 seconds.

The cooling stop temperature in the second cooling is set to higher than 600° C. and 700° C. (fifth temperature range) or lower. When the cooling stop temperature is 600° C. or lower, precipitation of Ti carbides in ferrite after transformation does not progress, so that the strength is degraded. Meanwhile, when the cooling stop temperature exceeds 700° C., dual-phase separation of ferrite and austenite is not sufficient, so that the intended area ratio of residual austenite cannot be obtained. In addition, precipitation of Ti carbides in ferrite is over-aged and the strength is degraded.

For example, the $Ar_3$ transformation point temperature (° C.) can be simply calculated based on a relationship with elements included in steel by the following equation (x).

$$Ar_3 = 910 - 310 \times C + 25 \times (Si + 2 \times Al) - 80 \times Mneq \tag{x}$$

Here, symbols for elements in the equations indicate amounts of the elements (by mass %) included in the steel sheet. In addition Mneq is expressed by the following equation (xi) in a case where B is not included and is expressed by the following equation (xii) in a case where B is included.

$$Mneq = Mn + Cr + Cu + Mo + Ni/2 + 10 \times (Nb - 0.02) \tag{xi}$$

$$Mneq = Mn + Cr + Cu + Mo + Ni/2 + 10 \times (Nb - 0.02) + 1 \tag{xii}$$

Subsequent to the second cooling, the third cooling is performed. In the third cooling, the steel sheet is cooled to a temperature of higher than 350° C. and 450° C. or lower (sixth temperature range) at the average cooling rate of 15° C./s or faster from the fifth temperature range. If the cooling rate is slower than 15° C./s, there is a possibility that pearlite will be incorporated into the structure, so that the intended microstructure will not be able to be obtained. The ending temperature in this cooling is the same as the winding temperature. In addition, there is no need to particularly limit the upper limit for the cooling rate in the third cooling process. However, in consideration of warping caused due to thermal strain, it is desirable that the upper limit is set to 300° C./s or slower.

After the third cooling, the steel sheet is wound at a temperature of higher than 350° C. and 450° C. or lower. If the winding temperature exceeds 450° C., a large amount of carbides is precipitated between the laths of bainite during bainitic transformation progressing after winding, so that the intended residual austenite cannot be obtained and sufficient elongation cannot be obtained. In addition, coarse carbides become a starting point of occurrence of a crack, so that there is a possibility that hole expansibility will deteriorate. Meanwhile, if the winding temperature is 350° C. or lower, a large amount of martensite is generated, so that residual austenite cannot be obtained and sufficient elongation cannot be obtained. In addition, since the starting point of a void caused at the time of hole expansion increases, hole expansibility also deteriorates.

During the cooling process after finish rolling, in order to efficiently exhibit precipitation strengthening by means of Ti carbides, the cooling pattern itself before winding is required to be controlled. Specifically, it is important that a total cumulative diffusion length Ltotal of Ti (μm) in ferrite satisfies the following equation (v).

$$0.15 \leq Ltotal \leq 0.4 \tag{v}$$

Here, the total cumulative diffusion length Ltotal (μm) is a value obtained by integrating a diffusion length L (μm) of Ti in ferrite, which is defined by the following equation (vi), by a minute time period Δt (s) that is a time before the steel sheet is wound from the cooling stop temperature. The value is expressed by the following equation (vii).

$$Ltotal = \Sigma(\sqrt{(D \times (T+273) \times \Delta t)}) \tag{vii}$$

D×(T+273) in the equation is a body diffusion coefficient (μm²/s) in T (° C.) and is expressed with a diffusion coefficient $D_0$ (μm²/S) of Ti, activation energy Q (kJ/mol), and a gas constant R (kJ/(mol·K)) as shown in the following equation (viii). In addition, t is a diffusion time (s), and Δt is an infinitesimal difference of time period in a case where the time before winding from the cooling stop temperature is divided into infinitesimal difference of times. In the present embodiment, Δt is 0.2 s.

$$D \times (T+273) = D_0 \times Exp(-Q/R \times (T+273)) \tag{viii}$$

If the total cumulative diffusion length Ltotal is shorter than 0.15 μm, precipitation of Ti carbides does not progress during cooling, thereby resulting in over-aging. Accordingly, it is not possible to efficiently achieve precipitation strengthening performance. Meanwhile, if Ltotal exceeds 0.4 μm, precipitation of Ti carbides excessively progresses during cooling, thereby resulting in over-aging as well. Accordingly, it is not possible to efficiently achieve precipitation strengthening performance.

As described above, the structure can be optimized by optimizing the cooling conditions in consideration of refining the grain diameter of austenite and reduction of C by means of Ti carbides precipitation.

<Other Processes>

Furthermore, in the method of manufacturing a steel sheet according to the present embodiment, for the purpose of improving ductility by means of correction of the steel sheet shape or introduction of moving dislocation, after the entire process ends, skin pass rolling with 0.1% to 2% of the rolling reduction may be executed. In addition, for the purpose of removing scale which adheres to a surface of an obtained hot rolled steel sheet, pickling may be performed as necessary. Moreover, after pickling is performed, skin pass rolling with 10% or lower of the rolling reduction, or cold rolling with up to approximately 40% of the rolling reduction may be executed with respect to the obtained hot rolled steel sheet in the line or off the line.

Moreover, before and/or after skin pass rolling, it is desirable that scale on the surface is removed. The method of removing scale is not particularly set. For example, any apparatus may be employed in accordance with the line, such as general pickling using hydrochloric acid or sulfate, surface grinding by means of a sander or the like, and surface scarfing utilizing plasma, a gas burner, or the like.

In addition, in the method of manufacturing a steel sheet according to the present embodiment, in any case of after casting, after hot rolling, and after cooling, a galvanized layer may be formed on a surface of a steel sheet by executing plating in a hot-dip plating line. Corrosion resistance of a hot rolled steel sheet is improved by executing plating in the hot-dip plating line. Moreover, surface treatment may be separately executed with respect to these hot rolled steel sheets.

In a case where galvanizing is executed with respect to a steel sheet after pickling, alloying treatment (alloying treatment process) may be performed as necessary by immersing the obtained steel sheet in a galvanizing bath. In a hot rolled steel sheet, in addition to improvement of corrosion resistance, welding resistance against various types of welding such as spot welding is improved by executing alloying.

FIG. 2 illustrates an example of a method of manufacturing a steel sheet according to the present embodiment.

EXAMPLES

Hereinafter, the present invention will be described more specifically based on Examples. However, the present invention is not limited to these Examples.

Pieces of steel No. A to Z and pieces of bloom a to d each having the chemical elements shown in Table 1 are subjected to smelting in a converter furnace through a secondary refining process, are directly fed or reheated after continuous casting, are subjected to rough rolling and finish rolling, are cooled on a run-out table, and are wound. As a result, hot rolled steel sheets (test No. 1 to 51) having sheet thicknesses of 2.3 mm to 3.4 mm are prepared. The manufacturing conditions of each piece of steel are shown in Tables 2-1 and 2-2 and Tables 3-1 and 3-2.

TABLE 1

| Steel No. | Chemical composition (by mass %, remainder: Fe and impurities) | | | | | | | | | | | | |
|---|---|---|---|---|---|---|---|---|---|---|---|---|---|
| | C | Si | Mn | P | S | Al | N | Ti | Nb | Cu | Ni | Mo | V |
| A | 0.096 | 0.04 | 1.48 | 0.001 | 0.002 | 0.490 | 0.0031 | 0.116 | 0.014 | — | — | — | — |
| B | 0.087 | 0.02 | 1.36 | 0.001 | 0.003 | 0.290 | 0.0035 | 0.073 | 0.009 | — | — | — | — |
| C | 0.082 | 0.48 | 0.34 | 0.001 | 0.003 | 0.060 | 0.0031 | 0.063 | — | — | — | — | — |
| D | 0.077 | 0.02 | 1.54 | 0.001 | 0.002 | 0.525 | 0.0039 | 0.022 | — | 0.04 | — | — | — |
| E | 0.148 | 0.02 | 1.51 | 0.001 | 0.001 | 0.523 | 0.0036 | 0.122 | — | — | 0.05 | — | — |
| F | 0.097 | 0.45 | 1.55 | 0.001 | 0.002 | 0.577 | 0.0038 | 0.121 | — | — | — | 0.20 | — |
| G | 0.102 | 0.09 | 1.54 | 0.001 | 0.002 | 0.506 | 0.0039 | 0.123 | — | — | — | — | 0.080 |
| H | 0.097 | 0.02 | 0.24 | 0.001 | 0.001 | 0.574 | 0.0044 | 0.119 | — | — | — | — | — |
| I | 0.100 | 0.02 | 2.10 | 0.001 | 0.002 | 0.534 | 0.0037 | 0.121 | — | — | — | — | — |
| J | 0.096 | 0.01 | 2.44 | 0.001 | 0.001 | 0.522 | 0.0040 | 0.116 | — | — | — | — | — |
| K | 0.102 | 0.01 | 2.88 | 0.001 | 0.001 | 0.568 | 0.0038 | 0.122 | — | — | — | — | — |
| L | 0.096 | 0.01 | 1.59 | 0.001 | 0.001 | 1.440 | 0.0038 | 0.119 | — | — | — | — | — |
| M | 0.102 | 0.02 | 1.56 | 0.001 | 0.002 | 0.950 | 0.0036 | 0.122 | — | — | — | — | — |
| N | 0.096 | 0.02 | 1.50 | 0.001 | 0.001 | 0.080 | 0.0042 | 0.123 | — | — | — | — | — |
| O | 0.099 | 0.02 | 1.59 | 0.001 | 0.001 | 0.508 | 0.0075 | 0.119 | — | — | — | — | — |
| P | 0.097 | 0.02 | 1.51 | 0.001 | 0.002 | 0.520 | 0.0054 | 0.115 | — | — | — | — | — |
| Q | 0.100 | 0.11 | 1.54 | 0.001 | 0.002 | 0.515 | 0.0037 | 0.184 | — | — | — | — | — |
| R | 0.099 | 0.01 | 1.53 | 0.001 | 0.001 | 0.589 | 0.0037 | 0.050 | — | — | — | — | — |
| S | 0.154 | 0.01 | 1.60 | 0.001 | 0.001 | 0.560 | 0.0040 | 0.122 | — | — | — | — | — |
| T | 0.073 | 0.02 | 1.58 | 0.001 | 0.001 | 0.507 | 0.0035 | 0.124 | — | — | — | — | — |
| U | 0.102 | 0.75 | 1.51 | 0.001 | 0.002 | 0.573 | 0.0043 | 0.116 | — | — | — | — | — |
| V | 0.099 | 0.01 | 3.20 | 0.001 | 0.001 | 0.593 | 0.0043 | 0.122 | — | — | — | — | — |
| W | 0.096 | 0.02 | 0.11 | 0.001 | 0.002 | 0.577 | 0.0039 | 0.116 | — | — | — | — | — |
| X | 0.104 | 0.02 | 1.55 | 0.080 | 0.001 | 0.567 | 0.0043 | 0.119 | — | — | — | — | — |
| Y | 0.100 | 0.01 | 1.51 | 0.001 | 0.010 | 0.522 | 0.0044 | 0.116 | — | — | — | — | — |
| Z | 0.104 | 0.01 | 1.55 | 0.001 | 0.002 | 0.520 | 0.0200 | 0.122 | — | — | — | — | — |
| a | 0.100 | 0.01 | 1.60 | 0.001 | 0.002 | 0.547 | 0.0039 | 0.220 | — | — | — | — | — |
| b | 0.100 | 0.02 | 1.54 | 0.001 | 0.002 | 0.523 | 0.0039 | 0.002 | — | — | — | — | — |
| c | 0.105 | 0.02 | 1.52 | 0.001 | 0.001 | 0.549 | 0.0088 | 0.020 | — | — | — | — | — |
| d | 0.102 | 0.01 | 1.55 | 0.001 | 0.002 | 2.100 | 0.0035 | 0.115 | — | — | — | — | — |

| Steel No. | Chemical composition (by mass %, remainder: Fe and impurities) | | | | | | | Left side of Equation (i)† | Ex. C‡ | Mn/S |
|---|---|---|---|---|---|---|---|---|---|---|
| | Cr | W | B | Mg | Ca | REM | Others | | | |
| A | — | — | — | — | — | 0.0007 | — | 0.102 | 0.069 | 740 |
| B | — | — | — | 0.0016 | — | — | — | 0.057 | 0.072 | 453 |
| C | — | — | — | — | 0.0008 | — | — | 0.048 | 0.070 | 113 |
| D | — | — | — | — | — | — | — | 0.006 | 0.076 | 770 |
| E | — | — | — | — | — | — | — | 0.108 | 0.121 | 1510 |
| F | — | — | — | — | — | — | — | 0.105 | 0.071 | 775 |
| G | — | — | — | — | — | — | — | 0.107 | 0.075 | 770 |
| H | 0.11 | — | 0.0014 | — | — | — | — | 0.102 | 0.072 | 240 |
| I | — | 0.02 | — | — | — | — | — | 0.106 | 0.074 | 1050 |
| J | — | — | — | — | — | — | — | 0.100 | 0.070 | 2440 |
| K | — | — | — | 0.0006 | — | — | — | 0.107 | 0.075 | 2880 |
| L | — | — | — | — | 0.0008 | — | — | 0.104 | 0.070 | 1590 |
| M | — | — | — | — | — | 0.0007 | — | 0.107 | 0.075 | 780 |
| N | — | — | — | — | — | — | Zr: 0.02% | 0.107 | 0.069 | 1500 |
| O | — | — | — | — | — | — | Sn: 0.01% | 0.091 | 0.076 | 1590 |
| P | — | — | — | — | — | — | Co: 0.002% | 0.094 | 0.073 | 755 |
| Q | — | — | — | — | — | — | Zn: 0.004% | 0.168 | 0.058 | 770 |
| R | — | — | — | — | — | — | — | 0.035 | 0.090 | 1530 |

TABLE 1-continued

| | | | | | | | | | |
|---|---|---|---|---|---|---|---|---|---|
| S | — | — | — | — | — | — | — | 0.106 | 0.127 | 1600 |
| T | — | — | — | — | — | — | — | 0.110 | 0.046 | 1580 |
| U | — | — | — | — | — | — | — | 0.099 | 0.077 | 755 |
| V | — | — | — | — | — | — | — | 0.105 | 0.073 | 3200 |
| W | — | — | — | — | — | — | — | 0.099 | 0.071 | 55 |
| X | — | — | — | — | — | — | — | 0.103 | 0.078 | 1550 |
| Y | — | — | — | — | — | — | — | 0.086 | 0.079 | 151 |
| Z | — | — | — | — | — | — | — | 0.050 | 0.092 | 775 |
| a | — | — | — | — | — | — | — | 0.204 | 0.049 | 800 |
| b | — | — | — | — | — | — | — | <u>−0.014</u> | 0.103 | 770 |
| c | — | — | — | — | — | — | — | <u>−0.012</u> | 0.108 | 1520 |
| d | — | — | — | — | — | — | — | 0.100 | 0.077 | 775 |

Underlines denote that the values are out of the requirement range of the present invention.
†Ti − 48 × (N/14 + S/32)
Ex. C = C − 12 × (Ti/48 + Nb/93 − N/14 − S/32)

TABLE 2-1

| | | | Slab heating process | | | Rough rolling process | | | | Average grain diameter |
|---|---|---|---|---|---|---|---|---|---|---|
| Test No. | Steel No. | SRTmin (° C.) | Ar₃ transformation point (° C.) | Heating temperature (° C.) | Holding time (min) | Total number of passes | Total rolling reduction (%) | The number of passes with 20% or higher | Time period (s) before start of finish rolling | (μm) of austenite immediately before finish rolling |
| 1 | A | 1215 | 792 | 1230 | 90 | 7 | 87 | 3 | 60 | 70 |
| 2 | A | 1215 | 792 | <u>1180</u> | 90 | 7 | 87 | 3 | 30 | 60 |
| 3 | A | 1215 | 792 | 1230 | 90 | 5 | <u>52</u> | 3 | 60 | 110 |
| 4 | A | 1215 | 792 | 1230 | 90 | 3 | 75 | 1 | 60 | 75 |
| 5 | A | 1215 | 792 | 1230 | 90 | 7 | 87 | <u>0</u> | 60 | 85 |
| 6 | A | 1215 | 792 | 1230 | 90 | 7 | 87 | 3 | <u>210</u> | 145 |
| 7 | A | 1215 | 792 | 1230 | 90 | 7 | 87 | 3 | 60 | 70 |
| 8 | A | 1215 | 792 | 1230 | 90 | 7 | 87 | 3 | 60 | 70 |
| 9 | A | 1215 | 792 | 1230 | 45 | 7 | 87 | 5 | 45 | 60 |
| 10 | A | 1215 | 792 | 1230 | 90 | 7 | 87 | 3 | 60 | 70 |
| 11 | A | 1215 | 792 | 1230 | 90 | 7 | 87 | 3 | 60 | 70 |
| 12 | A | 1215 | 792 | 1230 | 90 | 7 | 87 | 3 | 150 | 85 |
| 13 | A | 1215 | 792 | 1230 | 90 | 7 | 87 | 3 | 60 | 70 |
| 14 | A | 1215 | 792 | 1230 | 90 | 7 | 87 | 3 | 60 | 70 |
| 15 | A | 1215 | 792 | 1230 | 90 | 7 | 87 | 3 | 60 | 70 |
| 16 | A | 1215 | 792 | 1230 | 90 | 7 | 87 | 3 | 60 | 70 |
| 17 | A | 1215 | 792 | 1230 | 90 | 7 | 87 | 3 | 60 | 70 |
| 18 | A | 1215 | 792 | 1230 | 90 | 7 | 87 | 3 | 60 | 70 |
| 19 | A | 1215 | 792 | 1230 | 90 | 7 | 87 | 3 | 60 | 70 |
| 20 | A | 1215 | 792 | 1230 | 90 | 7 | 87 | 7 | 45 | 55 |
| 21 | A | 1215 | 792 | 1230 | 90 | 7 | 87 | 3 | 60 | 70 |
| 22 | A | 1215 | 792 | 1230 | 90 | 7 | 87 | 3 | 60 | 70 |
| 23 | B | 1142 | 798 | 1200 | 120 | 5 | 81 | 2 | 120 | 80 |
| 24 | C | 1117 | 888 | 1200 | 120 | 5 | 81 | 2 | 120 | 80 |
| 25 | D | 995 | 802 | 1200 | 120 | 5 | 81 | 2 | 120 | 80 |

Underlines denote that the values are out of the requirement range of the present invention.

TABLE 2-2

| | | | Slab heating process | | | Rough rolling process | | | Time period | Average grain diameter (μm) of |
|---|---|---|---|---|---|---|---|---|---|---|
| Test No. | Steel No. | SRTmin (° C.) | Ar₃ transformation point (° C.) | Heating temperature (° C.) | Holding time (min) | Total number of passes | Total rolling reduction (%) | The number of passes with 20% or higher | (s) before start of finish rolling | austenite immediately before finish rolling |
| 26 | E | 1285 | 784 | 1300 | 30 | 9 | 86 | 7 | 90 | 75 |
| 27 | F | 1223 | 796 | 1250 | 60 | 9 | 86 | 7 | 90 | 75 |
| 28 | G | 1231 | 799 | 1250 | 60 | 9 | 86 | 7 | 90 | 75 |
| 29 | H | 1220 | 817 | 1250 | 60 | 9 | 86 | 7 | 90 | 75 |
| 30 | I | 1227 | 754 | 1250 | 60 | 9 | 86 | 7 | 90 | 75 |
| 31 | J | 1214 | 728 | 1250 | 60 | 9 | 86 | 7 | 90 | 75 |
| 32 | K | 1231 | 693 | 1250 | 60 | 9 | 86 | 7 | 90 | 75 |

TABLE 2-2-continued

| | | | | Slab heating process | | | | Rough rolling process | | |
|---|---|---|---|---|---|---|---|---|---|---|
| Test No. | Steel No. | SRTmin (° C.) | Ar₃ transformation point (° C.) | Heating temperature (° C.) | Holding time (min) | Total number of passes | Total rolling reduction (%) | The number of passes with 20% or higher | Time period (s) before start of finish rolling | Average grain diameter (μm) of austenite immediately before finish rolling |
| 33 | L | 1220 | 841 | 1250 | 60 | 9 | 86 | 7 | 90 | 75 |
| 34 | M | 1231 | 817 | 1250 | 60 | 9 | 86 | 7 | 90 | 75 |
| 35 | N | 1224 | 780 | 1250 | 100 | 5 | 81 | 2 | 120 | 80 |
| 36 | O | 1223 | 794 | 1250 | 100 | 5 | 81 | 2 | 120 | 80 |
| 37 | P | 1216 | 802 | 1250 | 100 | 5 | 81 | 2 | 120 | 80 |
| 38 | Q | 1288 | 800 | 1300 | 45 | 9 | 86 | 7 | 90 | 75 |
| 39 | R | 1112 | 803 | 1200 | 150 | 5 | 81 | 2 | 120 | 80 |
| 40 | S | 1290 | 779 | 1300 | 40 | 9 | 86 | 7 | 90 | 75 |
| 41 | T | 1187 | 803 | 1200 | 180 | 3 | 77 | 1 | 150 | 85 |
| 42 | U | 1223 | 821 | 1250 | 45 | 9 | 86 | 7 | 90 | 75 |
| 43 | V | 1226 | 669 | — | — | — | — | — | — | — |
| 44 | W | 1215 | 917 | 1250 | 70 | 5 | 81 | 2 | 120 | 80 |
| 45 | X | 1230 | 799 | 1250 | 70 | 5 | 81 | 2 | 120 | 80 |
| 46 | Y | 1221 | 801 | 1250 | 70 | 5 | 81 | 2 | 120 | 80 |
| 47 | Z | 1234 | 796 | 1250 | 70 | 5 | 81 | 2 | 120 | 80 |
| 48 | a | 1315 | 795 | <u>1250</u> | 30 | 9 | 86 | 7 | 90 | 75 |
| 49 | b | <u>812</u> | 799 | 1230 | 180 | 5 | 81 | 2 | 120 | 80 |
| 50 | c | <u>1016</u> | 800 | 1230 | 180 | 5 | 81 | 2 | 120 | 80 |
| 51 | d | 1222 | <u>876</u> | 1230 | 70 | 5 | 81 | 2 | 120 | 80 |

Underlines denote that the values are out of the requirement range of the present invention.

TABLE 3-1

| | Finish rolling process | | | | | | Cooling process First cooling | | |
|---|---|---|---|---|---|---|---|---|---|
| Test No. | Rolling starting temperature (° C.) | Total number of passes | Total rolling reduction (%) | Average rolling reduction (%) of last 3 passes | Finish rolling exit-side speed (mpm) | Ending temperature (° C.) | Time period (s) before start of cooling | Cooling rate (° C./s) | Cooling stop temperature (° C.) |
| 1 | 980 | 7 | 90 | 18 | 570 | 830 | 1 | 50 | 680 |
| 2 | 940 | 7 | 90 | 18 | 630 | 830 | 1 | 50 | 680 |
| 3 | 990 | 7 | 94 | 21 | 550 | 830 | 1 | 50 | 680 |
| 4 | 960 | 7 | 90 | 18 | 570 | 830 | 1 | 50 | 680 |
| 5 | 980 | 7 | 90 | 18 | 570 | 830 | 1 | 50 | 680 |
| 6 | 950 | 7 | 90 | 18 | 590 | 830 | 1 | 50 | 680 |
| 7 | <u>905</u> | 7 | 90 | 18 | 750 | 830 | 1 | 40 | 680 |
| 8 | 980 | 7 | <u>74</u> | 12 | 570 | 830 | 1 | 40 | 680 |
| 9 | 980 | 7 | 90 | 18 | 500 | 830 | 2 | 40 | 675 |
| 10 | 980 | 7 | 84 | 11 | 550 | 830 | 1 | 50 | 680 |
| 11 | 980 | 7 | 90 | 18 | 420 | 810 | 3 | 55 | 670 |
| 12 | 960 | 7 | 90 | 18 | 250 | <u>750</u> | 3 | 55 | 670 |
| 13 | 980 | 7 | 90 | 18 | 700 | <u>910</u> | 1 | 35 | 680 |
| 14 | 980 | 6 | 90 | 18 | 250 | 830 | <u>6</u> | 55 | 670 |
| 15 | 980 | 7 | 90 | 18 | 570 | 830 | 1 | <u>5</u> | 710 |
| 16 | 980 | 7 | 90 | 18 | 570 | 830 | 1 | 30 | <u>800</u> |
| 17 | 980 | 7 | 90 | 18 | 570 | 830 | 1 | 65 | <u>520</u> |
| 18 | 980 | 7 | 90 | 18 | 570 | 830 | 1 | 50 | 670 |
| 19 | 980 | 7 | 90 | 18 | 570 | 830 | 1 | 50 | 670 |
| 20 | 940 | 7 | 90 | 18 | 600 | 830 | 1 | 50 | 670 |
| 21 | 980 | 7 | 90 | 18 | 570 | 830 | 1 | 50 | 670 |
| 22 | 980 | 7 | 90 | 18 | 570 | 830 | 1 | 50 | 670 |
| 23 | 960 | 7 | 91 | 20 | 570 | 850 | 1 | 40 | 685 |
| 24 | 990 | 7 | 91 | 20 | 570 | 920 | 1 | 70 | 700 |
| 25 | 990 | 7 | 91 | 20 | 570 | 850 | 1 | 50 | 690 |

TABLE 3-1-continued

| | | Cooling process | | | | |
|---|---|---|---|---|---|---|
| | | Second cooling | | | Third cooling | Entire cooling |
| | | | | Cooling | | Total |
| Test No. | | Cooling rate (° C./s) | Cooling time period (s) | stop temperature (° C.) | Cooling rate (° C./s) | Winding temperature (° C.) | cumulative diffusion length (µm) |

| Test No. | Cooling rate (° C./s) | Cooling time period (s) | Cooling stop temperature (° C.) | Cooling rate (° C./s) | Winding temperature (° C.) | Total cumulative diffusion length (µm) |
|---|---|---|---|---|---|---|
| 1 | 5 | 4 | 660 | 70 | 400 | 0.17 |
| 2 | 5 | 4 | 660 | 70 | 400 | 0.17 |
| 3 | 5 | 4 | 660 | 70 | 400 | 0.17 |
| 4 | 5 | 4 | 660 | 70 | 400 | 0.17 |
| 5 | 5 | 4 | 660 | 70 | 400 | 0.17 |
| 6 | 5 | 4 | 660 | 70 | 400 | 0.17 |
| 7 | 5 | 4 | 660 | 60 | 400 | 0.19 |
| 8 | 5 | 4 | 660 | 70 | 400 | 0.18 |
| 9 | 5 | 4 | 655 | 60 | 300 | 0.17 |
| 10 | 5 | 4 | 660 | 60 | 400 | 0.17 |
| 11 | 5 | 5 | 645 | 75 | 380 | 0.16 |
| 12 | 5 | 5 | 645 | 75 | 400 | — |
| 13 | 5 | 3 | 665 | 55 | 400 | 0.19 |
| 14 | 5 | 5 | 645 | 75 | 400 | 0.16 |
| 15 | 5 | 4 | 690 | 60 | 400 | 0.44 |
| 16 | 5 | 4 | 780 | 60 | 350 | — |
| 17 | 5 | 4 | 500 | 60 | 350 | 0.05 |
| 18 | 15 | 2 | 640 | 60 | 400 | 0.14 |
| 19 | — | 0 | 670 | 60 | 350 | 0.11 |
| 20 | 5 | 4 | 650 | 55 | 400 | 0.16 |
| 21 | 5 | 4 | 650 | 5 | 350 | 0.17 |
| 22 | 5 | 4 | 650 | 60 | 500 | 0.16 |
| 23 | 6 | 5 | 660 | 65 | 400 | 0.20 |
| 24 | 6 | 5 | 675 | 70 | 400 | 0.37 |
| 25 | 6 | 5 | 665 | 65 | 400 | 0.20 |

Underlines denote that the values are out of the requirement range of the present invention.

TABLE 3-2

| | Finish rolling process | | | | | Cooling process First cooling | | |
|---|---|---|---|---|---|---|---|---|
| Test No. | Rolling starting temperature (° C.) | Total number of passes | Total rolling reduction (%) | Average rolling reduction (%) of last 3 passes | Finish rolling exit-side speed (mpm) | Ending temperature (° C.) | Time period (s) before start of cooling | Cooling rate (° C./s) | Cooling stop temperature (° C.) |
| 26 | 940 | 7 | 89 | 16 | 470 | 840 | 2 | 35 | 680 |
| 27 | 940 | 7 | 89 | 16 | 500 | 840 | 2 | 40 | 685 |
| 28 | 940 | 7 | 91 | 20 | 570 | 840 | 1 | 40 | 685 |
| 29 | 980 | 7 | 93 | 22 | 600 | 860 | 1 | 75 | 710 |
| 30 | 950 | 7 | 89 | 16 | 470 | 820 | 2 | 25 | 680 |
| 31 | 940 | 7 | 88 | 15 | 430 | 800 | 2 | 15 | 665 |
| 32 | 940 | 7 | 88 | 15 | 430 | 770 | 2 | 15 | 690 |
| 33 | 980 | 6 | 91 | 20 | 570 | 880 | 1 | 40 | 710 |
| 34 | 960 | 7 | 91 | 20 | 570 | 860 | 1 | 40 | 695 |
| 35 | 950 | 7 | 88 | 15 | 430 | 830 | 2 | 35 | 680 |
| 36 | 940 | 6 | 91 | 20 | 570 | 840 | 1 | 40 | 680 |
| 37 | 950 | 7 | 91 | 20 | 570 | 840 | 1 | 40 | 685 |
| 38 | 940 | 7 | 91 | 20 | 570 | 840 | 1 | 40 | 685 |
| 39 | 950 | 7 | 91 | 20 | 570 | 840 | 1 | 45 | 670 |
| 40 | 960 | 7 | 91 | 20 | 570 | 820 | 1 | 45 | 675 |
| 41 | 950 | 7 | 91 | 20 | 570 | 840 | 1 | 40 | 690 |
| 42 | 950 | 7 | 91 | 20 | 570 | 860 | 1 | 40 | 700 |
| 43 | — | — | — | — | — | — | — | — | — |
| 44 | 980 | 7 | 91 | 20 | 570 | 940 | 1 | 50 | 725 |
| 45 | 950 | 7 | 91 | 20 | 570 | 850 | 1 | 40 | 685 |
| 46 | 940 | 7 | 91 | 20 | 570 | 850 | 1 | 40 | 690 |
| 47 | 940 | 6 | 89 | 16 | 510 | 850 | 2 | 40 | 685 |
| 48 | 940 | 7 | 91 | 20 | 570 | 850 | 1 | 40 | 685 |
| 49 | 955 | 7 | 88 | 15 | 450 | 850 | 2 | 35 | 685 |
| 50 | 950 | 7 | 89 | 16 | 470 | 850 | 2 | 35 | 685 |
| 51 | 960 | 7 | 91 | 20 | 570 | 920 | 1 | 35 | 725 |

TABLE 3-2-continued

| | Cooling process | | | | | Entire cooling |
|---|---|---|---|---|---|---|
| | Second cooling | | | Third cooling | | Total |
| Test No. | Cooling rate (° C./s) | Cooling time period (s) | Cooling stop temperature (° C.) | Cooling rate (° C./s) | Winding temperature (° C.) | cumulative diffusion length (μm) |
| 26 | 5 | 5 | 655 | 65 | 400 | 0.18 |
| 27 | 5 | 4 | 665 | 65 | 400 | 0.20 |
| 28 | 6 | 5 | 660 | 50 | 400 | 0.20 |
| 29 | 7 | 4 | 680 | 55 | 400 | 0.24 |
| 30 | 5 | 5 | 655 | 50 | 400 | 0.16 |
| 31 | 4 | 5 | 635 | 45 | 400 | 0.17 |
| 32 | 4 | 5 | 630 | 45 | 400 | 0.16 |
| 33 | 6 | 5 | 685 | 40 | 400 | 0.34 |
| 34 | 6 | 5 | 670 | 40 | 400 | 0.26 |
| 35 | 4 | 5 | 660 | 40 | 400 | 0.19 |
| 36 | 6 | 5 | 655 | 40 | 400 | 0.19 |
| 37 | 6 | 5 | 660 | 40 | 400 | 0.21 |
| 38 | 6 | 5 | 660 | 75 | 400 | 0.20 |
| 39 | 6 | 5 | 645 | 75 | 400 | 0.18 |
| 40 | 6 | 5 | 650 | 75 | 400 | 0.15 |
| 41 | 6 | 5 | 665 | 75 | 400 | 0.22 |
| 42 | 6 | 5 | 675 | 80 | 400 | 0.27 |
| 43 | — | — | — | — | — | — |
| 44 | 6 | 5 | 700 | 80 | 350 | 0.60 |
| 45 | 6 | 5 | 660 | 75 | 400 | 0.20 |
| 46 | 6 | 5 | 665 | 75 | 400 | 0.21 |
| 47 | 5 | 4 | 665 | 75 | 400 | 0.20 |
| 48 | 6 | 5 | 660 | 75 | 400 | 0.20 |
| 49 | 4 | 5 | 665 | 75 | 400 | 0.22 |
| 50 | 5 | 5 | 660 | 75 | 400 | 0.21 |
| 51 | 6 | 5 | 700 | 80 | 400 | 0.50 |

Underlines denote that the values are out of the requirement range of the present invention.

In Tables 2-1 and 2-2, "heating temperature" in the slab heating process indicates the maximum attained temperature during slab reheating, and "holding time" indicates the holding time at a predetermined heating temperature. In addition, "total number of passes" in the rough rolling process indicates the number of rolling passes in rough rolling, "total rolling reduction" indicates the rolling reduction from the start of rough rolling before the end of rough rolling, "the number of passes with 20% or higher" indicates the number of times of rolling with the rolling reduction of 20% or higher in a temperature of 950° C. to 1,050° C., "total rolling reduction" indicates the rolling reduction in the temperature of 950° C. to 1,050° C., "time period before start of finish rolling" indicates the time period from the end of the rough rolling process before the start of the finish rolling process, "average grain diameter of austenite immediately before finish rolling" indicates the average grain diameter of austenite grains immediately before a rough bar is engaged with a first stand in finish rolling. This average grain diameter of austenite immediately before finish rolling is acquired by cutting a rough bar before entering finish rolling using a crop shear or the like, causing an obtained crop piece to be subjected to rapid cooling as fast as possible such that the crop piece is cooled to substantially room temperature, etching a cross section parallel to its rolling direction, embossing the grain boundary of austenite, and measuring the result using an optical microscope. In this case, 20 visual fields or more are measured with a magnification of 50 or greater at the ¼ thickness of the steel sheet through an image analysis, a point counting method, or the like.

Moreover, in Tables 3-1 and 3-2, "rolling starting temperature" in the finish rolling process indicates the temperature immediately before being engaged with the first stand in finish rolling, "total number of passes" indicates the number of rolling passes in finish rolling, "total rolling reduction" indicates the rolling reduction in finish rolling from the start before the end of finish rolling, "average rolling reduction of last 3 passes" indicates the average value of the rolling reduction of three passes from the last pass including the last pass in finish rolling in which continuous rolling is performed a plurality of passes generally, "finish rolling exit-side speed" indicates an exit-side sheet threading speed at the rolling stand after the last reduction pass in finish rolling ends, and "ending temperature" indicates the temperature on the rolling stand exit-side immediately after the last pass in finish rolling. The rolling reduction may be an actual value calculated based on the sheet thickness or may be a setup value for the rolling stand. In addition, it is desirable that the temperature is measured using a radiation-type thermometer or a contact-type thermometer in each of the processes. However, the rolling reduction may be an estimated value based on a temperature model or the like.

From the viewpoint of precipitation control and microstructure control, the cooling process executed on the run-out table is divided into the first cooling, the second cooling, the third cooling, and winding subsequent thereafter. In Tables 3-1 and 3-2, "time period to start of cooling" in "first cooling" indicates the time period from being out from the rolling stand of the last pass in finish rolling before cooling starts by means of the run-out table, "cooling rate" indicates the average cooling rate of water cooling in the first cooling, and "cooling stop temperature" indicates the temperature at which water cooling stops in the first cooling. Next, "cooling rate" in "second cooling" indicates the average cooling rate by means of air cooling during which water is not applied mainly, "holding time" indicates the time period for air cooling and holding during which water is not applied, and "cooling stop temperature" indicates the temperature at which air cooling and holding during which water is not applied ends. A case where the cooling time period in this second cooling is zero indicates that water cooling is not stopped. Moreover, "cooling rate" in "third cooling" indicates the average cooling rate from the restart of water cooling before being wound after air cooling and holding, and "winding temperature" indicates the temperature immediately before a steel sheet is wound in a coil shape by a winding mill while water cooling is stopped. Since the time period from the stop of water cooling before winding is short, in the present invention, the cooling stop temperature in the third cooling is substantially equal to the winding temperature. Lastly, "total cumulative diffusion length" indicates a value calculated by the equation (vii) described above.

Tables 4-1 and 4-2, and Tables 5-1 and 5-2 show microstructures, mechanical properties, surface characteristics, and corrosion resistance of the steel sheets obtained by the manufacturing method disclosed in Tables 2-1 and 2-2 and Tables 3-1 and 3-2. First, a sample was collected from a position of ¼ or ¾ the width of each of the obtained steel sheets, and the microstructure at ¼ thickness of the sheet sheets was observed using an optical microscope. As an adjustment for the sample, a cross section of the sheet thickness in the rolling direction was polished as an observed section, and the observed section was etched with a nital reagent and a Le Pera reagent. The micro-structures were categorized from an optical microscopic photograph at a magnification of 500 etched with the nital the reagent and the Le Pera reagent. In the micro-structures in Tables 4-1 and 4-2, the area ratio of martensite is the total area ratio of fresh martensite and tempered martensite.

TABLE 4-1

| Test No. | | Polygonal ferrite by area ratio (%) | Residual austenite by area ratio (%) | Bainite by area ratio (%) | Martensite by area ratio (%) | Other structures (%) | Dispersion state of residual γ | Austenite volume percentage fsd (%) |
|---|---|---|---|---|---|---|---|---|
| 1 | A | 69 | 6 | 25 | 0 | 0 | island shape | 6.0 |
| 2 | A | 65 | 5 | 30 | 0 | 0 | island shape | 5.0 |
| 3 | A | 63 | 7 | 30 | 0 | 0 | island shape | 6.5 |
| 4 | A | 71 | 6 | 23 | 0 | 0 | island shape | 5.5 |
| 5 | A | 61 | 7 | 32 | 0 | 0 | film shape | 6.8 |
| 6 | A | 72 | 6 | 22 | 0 | 0 | island shape | 6.1 |
| 7 | A | 78 | 6 | 16 | 0 | 0 | island shape | 6.2 |
| 8 | A | 55 | 5 | 40 | 0 | 0 | island shape | 5.4 |
| 9 | A | 60 | <u>0</u> | 40 | <u>6</u> | 0 | — | — |
| 10 | A | 72 | 5 | 23 | 0 | 0 | island shape | 5.2 |
| 11 | A | 71 | 6 | 23 | 0 | 0 | island shape | 5.6 |
| 12 | A | <u>15</u> | 6 | 22 | 0 | Processed F57 | array shape | 5.7 |
| 13 | A | <u>42</u> | <u>13</u> | 45 | 0 | 0 | island shape | 13.0 |
| 14 | A | 83 | 5 | 12 | 0 | 0 | island shape | 5.0 |
| 15 | A | 77 | <u>0</u> | <u>0</u> | <u>0</u> | P23 | — | — |
| 16 | A | <u>0</u> | <u>0</u> | 100 | 0 | 0 | — | — |
| 17 | A | <u>0</u> | <u>0</u> | 100 | 0 | 0 | — | — |
| 18 | A | <u>0</u> | 5 | <u>95</u> | 0 | 0 | island shape | 5.3 |
| 19 | A | <u>0</u> | <u>0</u> | 100 | 0 | 0 | — | — |
| 20 | A | 73 | 6 | 21 | 0 | 0 | island shape | 5.8 |
| 21 | A | 83 | <u>0</u> | <u>0</u> | 0 | P17 | — | — |
| 22 | A | 59 | <u>0</u> | 37 | 0 | Coarse θ4 | — | — |
| 23 | B | 81 | 5 | 14 | 0 | 0 | island shape | 5.0 |
| 24 | C | 84 | 5 | 11 | 0 | 0 | island shape | 5.0 |
| 25 | D | 83 | 7 | 10 | 0 | 0 | island shape | 7.0 |

| Test No. | Austenite average grain diameter (μm) | Ex. C/fsd | Average value of distances of closest distances (μm) | Nano hardness Hn (GPa) | Nano hardness standard deviation σHn (GPa) | Ferrite TiC density (pieces/cm³) |
|---|---|---|---|---|---|---|
| 1 | 4.0 | 0.0114 | 4.5 | 11.1 | 1.0 | 5 × 10¹⁶ |
| 2 | 3.5 | 0.0137 | 3.6 | 9.4 | 0.8 | <u>5 × 10¹³</u> |
| 3 | <u>6.0</u> | 0.0106 | <u>13.9</u> | 11.5 | 1.0 | <u>2 × 10¹⁶</u> |
| 4 | 5.0 | 0.0125 | 9.5 | 10.5 | 0.9 | 6 × 10¹⁶ |
| 5 | <u>8.0</u> | 0.0101 | <u>31.5</u> | 11.7 | 1.3 | 5 × 10¹⁶ |
| 6 | <u>7.0</u> | 0.0112 | <u>23.5</u> | 11.2 | 1.0 | <u>2 × 10¹³</u> |
| 7 | <u>6.5</u> | 0.0111 | <u>18.5</u> | 11.3 | 1.0 | <u>3 × 10¹³</u> |
| 8 | <u>7.0</u> | 0.0127 | <u>26.6</u> | 10.3 | 0.9 | <u>2 × 10¹⁶</u> |
| 9 | — | — | — | — | — | 2 × 10¹⁶ |
| 10 | 4.5 | 0.0132 | 7.3 | 9.9 | 0.8 | 3 × 10¹⁶ |
| 11 | 5.0 | 0.0123 | 9.3 | 10.6 | 0.9 | 2 × 10¹⁶ |
| 12 | 3.0 | 0.0120 | <u>2.0</u> | 10.8 | 0.9 | <u>2 × 10⁹</u> |
| 13 | <u>7.0</u> | <u>0.0053</u> | <u>11.0</u> | 16.0 | 1.4 | <u>5 × 10¹⁶</u> |
| 14 | <u>8.0</u> | 0.0137 | <u>42.9</u> | 9.4 | 0.8 | <u>5 × 10¹¹</u> |

TABLE 4-1-continued

| | | | | | | |
|---|---|---|---|---|---|---|
| 15 | — | — | — | — | — | <u>2 × 10^11</u> |
| 16 | — | — | — | — | — | <u>Not observed</u> |
| 17 | — | — | — | — | — | <u>Not observed</u> |
| 18 | 4.0 | 0.0129 | 5.1 | 10.1 | 0.9 | <u>2 × 10^11</u> |
| 19 | — | — | — | — | — | <u>Not observed</u> |
| 20 | 4.0 | 0.0118 | 4.6 | 10.9 | 0.9 | 2 × 10^16 |
| 21 | — | — | — | — | — | <u>2 × 10^13</u> |
| 22 | — | — | — | — | — | <u>5 × 10^9</u> |
| 23 | 4.5 | 0.0143 | 7.6 | 8.7 | 0.7 | 3 × 10^16 |
| 24 | 4.0 | 0.0140 | 5.4 | 9.0 | 0.8 | 2 × 10^16 |
| 25 | 5.0 | 0.0108 | 7.5 | 11.4 | 1.0 | 1 × 10^16 |

Underlines denote that the values are out of the requirement range of the present invention.

TABLE 4-2

| | | Micro-structure | | | | | | |
|---|---|---|---|---|---|---|---|---|
| Test No. | | Polygonal ferrite by area ratio (%) | Residual austenite by area ratio (%) | Bainite by area ratio (%) | Martensite by area ratio (%) | Other structures (%) | Dispersion state of residual γ | Austenite volume percentage fsd (%) |
| 26 | E | 65 | 9 | 26 | 0 | 0 | island shape | 9.0 |
| 27 | F | 69 | 5 | 26 | 0 | 0 | island shape | 5.0 |
| 28 | G | 71 | 5 | 24 | 0 | 0 | island shape | 5.0 |
| 29 | H | 84 | 5 | 11 | 0 | 0 | island shape | 5.0 |
| 30 | I | 62 | 6 | 32 | 0 | 0 | island shape | 6.0 |
| 31 | J | 59 | 5 | 36 | 0 | 0 | island shape | 5.0 |
| 32 | K | 52 | 7 | 41 | 0 | 0 | island shape | 7.0 |
| 33 | L | 67 | 5 | 28 | 0 | 0 | island shape | 5.0 |
| 34 | M | 68 | 5 | 27 | 0 | 0 | island shape | 5.1 |
| 35 | N | 79 | 5 | 16 | 0 | 0 | island shape | 5.2 |
| 36 | O | 66 | 5 | 29 | 0 | 0 | island shape | 6.1 |
| 37 | P | 69 | 6 | 25 | 0 | 0 | island shape | 6.0 |
| 38 | Q | 70 | 5 | 25 | 0 | 0 | island shape | 5.0 |
| 39 | R | 77 | 7 | 16 | 0 | 0 | island shape | 6.5 |
| 40 | S | <u>38</u> | <u>12</u> | <u>50</u> | 0 | 0 | array shape | 12.0 |
| 41 | T | <u>100</u> | <u>0</u> | <u>0</u> | 0 | 0 | — | — |
| 42 | U | 65 | <u>5</u> | 30 | 0 | 0 | island shape | 5.0 |
| 43 | V | — | — | — | — | — | — | — |
| 44 | W | <u>0</u> | <u>0</u> | <u>100</u> | 0 | 0 | — | — |
| 45 | X | 68 | 6 | 26 | 0 | 0 | island shape | 6.0 |
| 46 | Y | 72 | 6 | 22 | 0 | 0 | island shape | 5.5 |
| 47 | Z | 65 | 7 | 28 | 0 | 0 | island shape | 7.0 |
| 48 | a | <u>100</u> | <u>0</u> | <u>0</u> | 0 | 0 | — | — |
| 49 | b | 78 | 8 | 14 | 0 | 0 | island shape | 8.0 |
| 50 | c | 53 | <u>11</u> | 36 | 0 | 0 | island shape | 10.5 |
| 51 | d | <u>0</u> | 6 | <u>49</u> | 0 | Processed F45 | array shape | 5.5 |

| | Micro-structure | | | | | |
|---|---|---|---|---|---|---|
| Test No. | Austenite average grain diameter (μm) | Ex. C/fsd | Average value of distances of closest distances (μm) | Nano hardness Hn (GPa) | Nano hardness standard deviation σHn (GPa) | Ferrite TiC density (pieces/cm³) |
| 26 | 4.5 | 0.0134 | 4.2 | 9.6 | 0.8 | 5 × 10^16 |
| 27 | 3.5 | 0.0142 | 3.6 | 8.8 | 0.8 | 5 × 10^16 |
| 28 | 4.8 | 0.0150 | 9.3 | 7.9 | 0.7 | 6 × 10^16 |
| 29 | 4.0 | 0.0144 | 5.4 | 8.6 | 0.7 | 4 × 10^16 |
| 30 | 5.0 | 0.0123 | 8.7 | 10.6 | 0.9 | 5 × 10^16 |
| 31 | 3.5 | 0.0141 | 3.6 | 9.0 | 0.8 | 3 × 10^16 |
| 32 | 4.0 | 0.0108 | 3.8 | 11.5 | 1.0 | 7 × 10^16 |
| 33 | 4.5 | 0.0141 | 7.6 | 9.0 | 0.8 | 3 × 10^16 |
| 34 | 4.0 | 0.0147 | 5.3 | 8.3 | 0.7 | 4 × 10^16 |
| 35 | 3.5 | 0.0133 | 3.5 | 9.8 | 0.8 | 4 × 10^16 |
| 36 | 5.0 | 0.0125 | 8.6 | 10.5 | 0.9 | 3 × 10^16 |
| 37 | 5.0 | 0.0122 | 8.7 | 10.6 | 0.9 | 5 × 10^16 |
| 38 | 3.4 | 0.0116 | 3.3 | 11.1 | 0.9 | 5 × 10^16 |
| 39 | 5.0 | 0.0139 | 8.1 | 9.2 | 0.8 | 3 × 10^16 |
| 40 | <u>7.0</u> | 0.0106 | <u>12.0</u> | 11.5 | 1.0 | 3 × 10^16 |
| 41 | — | — | — | — | — | <u>2 × 10^9</u> |
| 42 | 3.5 | <u>0.0154</u> | 3.6 | 7.3 | 0.6 | 5 × 10^16 |
| 43 | — | — | — | — | — | — |
| 44 | — | — | — | — | — | <u>Not observed</u> |
| 45 | 5.0 | 0.0131 | 8.7 | 10.0 | 0.9 | 5 × 10^16 |
| 46 | 4.0 | 0.0143 | 4.9 | 8.7 | 0.7 | 5 × 10^16 |

TABLE 4-2-continued

| | | | | | | |
|---|---|---|---|---|---|---|
| 47 | 4.5 | 0.0131 | 5.5 | 9.9 | 0.9 | $\underline{5 \times 10^{11}}$ |
| 48 | — | — | — | — | — | $\underline{5 \times 10^{16}}$ |
| 49 | <u>8.0</u> | 0.0129 | <u>26.8</u> | 10.1 | 0.9 | $5 \times 10^{8}$ |
| 50 | <u>6.0</u> | 0.0102 | 8.6 | 11.6 | 1.0 | Not observed |
| 51 | 4.0 | 0.0139 | 4.9 | 9.1 | 0.8 | $2 \times 10^{8}$ |

Underlines denote that the values are out of the requirement range of the present invention.

TABLE 5-1

| | Mechanical properties | | | | | | Surface characteristics | | Corrosion resistance | | |
|---|---|---|---|---|---|---|---|---|---|---|---|
| | Tensile test | | | | Hole expansion | Notch fatigue | Surface defects GOOD: none | Roughness | Chemical conversion Presence or absence of poor hiding GOOD: none | | Corrosion resistance after coating Maximum |
| Test No. | YP (MPa) | TS (MPa) | El (%) | TS × El (MPa %) | λ (%) | $\sigma_{WK}$/TS | OK: minor NG: present | Rz (μm) | OK: minor NG: present | P-ratio | peeling range (mm) | Remarks |
| 1 | 667 | 764 | 31.4 | 24000 | 115 | 0.42 | GOOD | 18.0 | GOOD | 0.95 | 2.2 | Example of present invention |
| 2 | 467 | 527 | 39.0 | 20549 | 169 | 0.34 | GOOD | 19.4 | GOOD | 0.88 | 0.6 | Comparative Example |
| 3 | 669 | 768 | 31.3 | 24000 | 41 | 0.33 | GOOD | 14.5 | GOOD | 0.92 | 3.1 | |
| 4 | 680 | 796 | 30.2 | 24000 | 114 | 0.36 | GOOD | 12.7 | GOOD | 0.85 | 2.8 | Example of present invention |
| 5 | 672 | 790 | 30.4 | 24000 | 56 | 0.36 | GOOD | 10.9 | GOOD | 0.89 | 0.4 | Comparative Example |
| 6 | 460 | 529 | 38.0 | 20113 | 50 | 0.34 | GOOD | 14.1 | GOOD | 0.84 | 0.5 | |
| 7 | 427 | 498 | 40.0 | 19920 | 174 | 0.34 | GOOD | 13.4 | GOOD | 0.87 | 2.0 | |
| 8 | 701 | 812 | 29.6 | 24000 | 46 | 0.34 | GOOD | 16.1 | GOOD | 0.88 | 0.2 | |
| 9 | 678 | 778 | 24.0 | 18665 | 96 | 0.36 | OK: Si scale | 19.4 | GOOD | 0.88 | 1.3 | |
| 10 | 661 | 765 | 31.4 | 24000 | 115 | 0.35 | GOOD | 17.5 | GOOD | 0.84 | 1.0 | Example of present invention |
| 11 | 666 | 773 | 31.0 | 24000 | 116 | 0.38 | GOOD | 16.4 | GOOD | 0.89 | 2.8 | |
| 12 | 674 | 777 | 19.7 | 15297 | 54 | 0.36 | GOOD | 11.0 | GOOD | 0.87 | 1.1 | Comparative Example |
| 13 | 711 | 819 | 29.3 | 24000 | 59 | 0.34 | GOOD | 12.2 | GOOD | 0.87 | 2.7 | |
| 14 | 432 | 490 | 40.0 | 19600 | 44 | 0.34 | GOOD | 16.1 | GOOD | 0.88 | 2.1 | |
| 15 | 620 | 714 | 24.1 | 17207 | 42 | 0.22 | GOOD | 12.0 | GOOD | 0.91 | 1.3 | |
| 16 | 438 | 513 | 37.0 | 18966 | 171 | 0.23 | GOOD | 14.5 | GOOD | 0.87 | 1.0 | |
| 17 | 446 | 513 | 36.4 | 18659 | 169 | 0.24 | GOOD | 11.6 | GOOD | 0.89 | 0.9 | |
| 18 | 438 | 499 | 38.0 | 18943 | 68 | 0.36 | GOOD | 15.7 | GOOD | 0.88 | 1.1 | |
| 19 | 451 | 524 | 34.0 | 17813 | 173 | 0.25 | GOOD | 16.8 | GOOD | 0.90 | 3.1 | |
| 20 | 656 | 750 | 32.0 | 24000 | 117 | 0.38 | GOOD | 13.1 | GOOD | 0.91 | 0.8 | Example of present invention |
| 21 | 609 | 705 | 22.6 | 15924 | 66 | 0.22 | GOOD | 16.2 | GOOD | 0.91 | 0.7 | Comparative Example |
| 22 | 645 | 755 | 27.4 | 20676 | 57 | 0.33 | GOOD | 10.2 | GOOD | 0.94 | 1.7 | |
| 23 | 522 | 601 | 39.9 | 24000 | 149 | 0.40 | GOOD | 16.2 | GOOD | 0.92 | 0.3 | Example of present invention |
| 24 | 473 | 544 | 41.0 | 22304 | 167 | 0.37 | OK: Si scale | 20.0 | OK | 0.86 | 3.7 | |
| 25 | 461 | 544 | 37.0 | 19865 | 165 | 0.39 | GOOD | 15.4 | GOOD | 0.91 | 3.0 | |

TABLE 5-2

| | Mechanical properties | | | | | | Surface characteristics | | Corrosion resistance | | |
|---|---|---|---|---|---|---|---|---|---|---|---|
| | Tensile test | | | | Hole expansion | Notch fatigue | Surface defects GOOD: none | Roughness | Chemical conversion Presence or absence of poor hiding GOOD: none | | Corrosion resistance after coating Maximum |
| | YP (MPa) | TS (MPa) | El (%) | TS × El (MPa %) | λ (%) | $\sigma_{WK}$/TS | OK: minor NG: present | Rz (μm) | OK: minor NG: present | P-ratio | peeling range (mm) | Remarks |
| 26 | 750 | 865 | 27.8 | 24000 | 104 | 0.39 | GOOD | 19.9 | GOOD | 0.85 | 2.7 | Example of present invention |
| 27 | 687 | 795 | 30.2 | 24000 | 110 | 0.37 | OK: Si scale | 19.9 | OK | 0.85 | 3.9 | |
| 28 | 672 | 783 | 30.7 | 24000 | 113 | 0.37 | OK: Si scale | 11.8 | GOOD | 0.85 | 3.8 | |

TABLE 5-2-continued

| | Mechanical properties | | | | Hole expansion | Notch fatigue $\sigma_{WK}/TS$ | Surface characteristics Surface defects GOOD: none NG: present | Roughness Rz (μm) | Corrosion resistance Chemical conversion Presence or absence of poor hiding GOOD: none OK: minor NG: present | Corrosion resistance after coating Maximum peeling range | |
|---|---|---|---|---|---|---|---|---|---|---|---|
| | Tensile test | | | | λ (%) | | | | | | |
| | YP (MPa) | TS (MPa) | El (%) | TS × El (MPa %) | | | | | P-ratio | (mm) | Remarks |
| 29 | 458 | 540 | 38.0 | 19714 | 168 | 0.39 | GOOD | 14.0 | GOOD | 0.90 | 1.9 | |
| 30 | 787 | 920 | 26.1 | 24000 | 97 | 0.39 | GOOD | 19.1 | GOOD | 0.89 | 2.6 | |
| 31 | 844 | 976 | 24.6 | 24000 | 92 | 0.38 | OK: scale | 19.5 | GOOD | 0.90 | 3.2 | |
| 32 | 966 | 1127 | 19.7 | 22210 | 80 | 0.37 | OK: scale | 19.1 | GOOD | 0.94 | 0.4 | |
| 33 | 714 | 832 | 28.9 | 24000 | 108 | 0.38 | OK: scale | 16.5 | GOOD | 0.92 | 0.9 | |
| 34 | 660 | 775 | 31.0 | 24000 | 115 | 0.40 | GOOD | 15.9 | GOOD | 0.92 | 3.1 | |
| 35 | 550 | 625 | 37.4 | 23360 | 140 | 0.38 | GOOD | 11.6 | GOOD | 0.92 | 0.8 | |
| 36 | 699 | 804 | 29.9 | 24000 | 112 | 0.39 | GOOD | 10.9 | GOOD | 0.89 | 0.3 | |
| 37 | 687 | 798 | 30.1 | 24000 | 111 | 0.39 | GOOD | 11.4 | GOOD | 0.85 | 3.5 | |
| 38 | 664 | 779 | 30.8 | 24000 | 113 | 0.39 | GOOD | 17.9 | OK | 0.80 | 3.9 | |
| 39 | 586 | 668 | 34.8 | 23250 | 135 | 0.38 | OK: scale | 13.1 | GOOD | 0.87 | 1.0 | |
| 40 | 811 | 945 | 23.6 | 22309 | 42 | 0.36 | OK: scale | 11.2 | GOOD | 0.92 | 0.2 | Comparative Example |
| 41 | 383 | 428 | 40.3 | 17248 | 200 | 0.35 | GOOD | 14.1 | GOOD | 0.92 | 3.1 | |
| 42 | 738 | 864 | 27.8 | 24000 | 104 | 0.37 | NG: Si scale | 30.9 | NG | 0.61 | 8.0 | |
| 43 | — | — | — | — | — | — | — | — | — | — | — | |
| 44 | 412 | 484 | 34.5 | 16708 | 183 | 0.37 | GOOD | 18.6 | GOOD | 0.92 | 1.0 | |
| 45 | 712 | 832 | 28.8 | 24000 | 106 | 0.25 | GOOD | 17.3 | GOOD | 0.91 | 1.8 | |
| 46 | 675 | 784 | 30.6 | 24000 | 43 | 0.34 | OK: scale | 13.2 | GOOD | 0.92 | 0.3 | |
| 47 | 595 | 683 | 32.0 | 21869 | 50 | 0.34 | OK: scale | 13.7 | GOOD | 0.89 | 1.4 | |
| 48 | 712 | 817 | 21.0 | 17159 | 111 | 0.23 | OK: scale | 13.3 | GOOD | 0.92 | 1.0 | |
| 49 | 450 | 519 | 39.0 | 20233 | 51 | 0.39 | GOOD | 11.2 | GOOD | 0.86 | 0.1 | |
| 50 | 628 | 725 | 33.1 | 24000 | 38 | 0.25 | GOOD | 13.6 | GOOD | 0.93 | 1.5 | |
| 51 | 654 | 765 | 18.3 | 14001 | 48 | 0.34 | OK: scale | 12.5 | GOOD | 0.85 | 1.2 | |

In addition, the dispersion state of residual austenite (second phase) was checked through an image analysis from the optical microscopic photograph at a magnification of 500 etched with the Le Pera reagent. Here, the dispersion states of residual austenite were categorized in "island shape" in which pieces of residual austenite were dispersed in an island shape on corners, edges, and intergranular surfaces of ferrite grains, "array shape" out of the island shape in which pieces of residual austenite were distributed in a row being balanced in the rolling direction, and "film shape" in which pieces of residual austenite were mainly dispersed so as to surround the intergranular surfaces of ferrite grains.

Moreover, the area ratio of residual austenite and the average grain diameter were obtained through an image analysis. In addition, Ex.C/fsd in Tables 4-1 and 4-2 was a value resulted by dividing Ex.C (%) in Table 1 by the area ratio (%) of the residual austenite. The average crystal grain diameter of residual austenite was obtained through the number average of the circle equivalent diameters. In addition, arbitrary residual austenite was selected, and distances at 20 points from the closest residual austenite were measured. Then, the average value thereof was taken as "the average value of distances of closest distances of residual austenite".

The nano hardness Hn was measured using Triboscope/Triboindenter manufactured by Hysitron, Inc. As the measurement conditions, hardness of residual austenite having 20 points or more in load of 1 mN was measured, and the arithmetical mean thereof and the standard deviation were calculated.

"Ferrite TiC density" was the density of precipitate containing TiC and was measured through the three-dimensional atom probe measurement method. First, a needle-shaped sample was prepared from the sample of a measurement subject by performing cutting and the electrolytic polishing method utilizing the focused ion beam processing method together with the electrolytic polishing method as necessary. Through the three-dimensional atom probe measurement, integrated data was reconstructed and a distribution pattern of real atoms in a real space could be obtained. The number density of the TiC precipitate was obtained based on the volume of the TiC precipitate in the three-dimensional distribution image and the number of the TiC precipitate. The ferrite grain was specified for the measurement executed with five or more ferrite grains for each sample. In addition, as the size of the TiC precipitate, the diameter calculated based on the number of constituent atoms of the observed TiC precipitate and the lattice constant of TiC was taken as the size on the assumption that the precipitate has a spherical shape. The diameter of 30 pieces or more of TiC precipitate was arbitrarily measured. The average value was approximately 2 nm to 30 nm.

The yield strength (YP), the tensile strength (TS), and the elongation (El) in the mechanical properties were evaluated in accordance with JIS Z 2241 (2011) using the test piece No. 5 of the same standard collected from a position of ¼ or ¾ the width in a direction perpendicular to the rolling direction. As an index of hole expansibility, the hole expansion test was employed. In the hole expansion test, a test piece was collected from a position similar to the position where the tensile test piece was collected, and evaluation was performed in accordance with the test method disclosed in Japan Iron and Steel Federation Standard (JFS T 1001 (1996)).

Next, in order to research for the notch fatigue strength, a fatigue test piece having a shape illustrated in FIG. 1 was collected from a position similar to the position where the tensile test piece was collected such that the rolling direction became a long side, and the fatigue test piece was used in a fatigue test. Here, the fatigue test piece illustrated in FIG. 1 was a notch test piece prepared for acquiring notch fatigue strength. The side surface corner of the test piece in FIG. 1 was chamfered at 1R and was polished with #600 in the longitudinal direction. In order to approximate to fatigue property evaluation for vehicle components in actual use, notch was provided by punching the test piece with a cylinder punch, similar to the hole expansion test piece. The punching clearance was set to 12.5%. However, the fatigue test piece was subjected to three-ridge finish grinding to the depth of approximately 0.05 mm from the outermost layer. The fatigue test was performed using Schenk fatigue tester and the test method conformed to JIS Z 2273 (1978) and JIS Z 2275 (1978). The notch fatigue properties "$\sigma_{WK}/TS$" illustrated in Tables 3-1 and 3-2 were a value resulted by dividing the fatigue strength of two million times acquired in this test by the tensile strength.

The surface characteristics were evaluated based on the surface defects and the roughness before pickling. If this evaluation point is equal to or lower than the standard, there are cases where consumers evaluate the surface appearance quality to be subordinated due to the pattern caused by the scale defects or unevenness of the surface even after pickling. Here, as the surface defects, the result of visually checking the presence or absence of the scale defects such as Si scale, scale, and spindle was indicated. A case having a scale defect was indicated as "NG", and a case having no scale defect was indicated as "GOOD". If these defects were partially present or below the standard, the defects were accepted as minor defects and were indicated as "OK". The roughness was evaluated by Rz and was indicated with a value obtained through a measurement method disclosed in JIS B 0601 (2013). If Rz is 20 µm or smaller, there is no problem in the level of the surface appearance quality.

Corrosion resistance was evaluated based on the chemical convertibility and the corrosion resistance after coating. Specifically, a manufactured steel sheet was subjected to pickling, and then was subjected to chemical conversion for coating a zinc phosphate film of 2.5 g/m². In this stage, as "chemical convertibility", the presence or absence of poor hiding was checked and a measurement of the P-ratio was executed.

The phosphate chemical conversion is treatment in which a chemical having phosphate and Zn ion as main components is used and is chemical reaction of generating crystal called phosphofilite: $FeZn_2 (PO_4)_3 \cdot 4H_2O$ occurs with respect to Fe ion eluted from a steel sheet. The technological points of the phosphate chemical conversion are as follows: (1) Fe ion is eluted such that reaction is promoted, and (2) phosphofilite crystal is minutely formed on the surface of a steel sheet. Particularly, in regard to (1), if oxides caused due to Si scale remains on the surface of a steel sheet, elution of Fe is hindered. Accordingly, there appears a portion which is not coated with the chemical conversion film called poor hiding, and Fe is not eluted. Consequently, an abnormal chemical conversion film called hopite: $Zn_3 (PO_4)_3 \cdot 4H_2O$ which is not originally formed on an iron surface is formed, and thus the performance after coating deteriorates. Therefore, it is important to cause Fe on the surface of a steel sheet to be eluted by means of phosphate and to make the surface normal such that Fe ion is sufficiently supplied.

The poor hiding could be checked through an observation using an electronic scanning microscope. Approximately 20 visual fields were observed with a magnification of 1,000. In a case where the entire surface was evenly coated and no poor hiding was checked, it was indicated as "GOOD" having no poor hiding. In addition, if the visual fields in which poor hiding could be checked were 5% or less, it was accepted as a minor and indicated as "OK". If visual fields having poor hiding exceeded 5%, it was evaluated "NG" for having poor hiding.

Meanwhile, the P-ratio can be measured using an X-ray diffraction apparatus. A ratio of an X-ray diffraction strength P on the phosphofilite (100) surface and an X-ray diffraction strength H on the hopite (020) surface is taken and evaluated by P-ratio=P/(P+H). That is, the P-ratio expresses a ratio of hopite and phosphofilite in a film which is obtained by performing chemical conversion. An increase of the P-ratio denotes that more phosphofilite is included and phosphofilite crystal is minutely formed on the surface of a steel sheet. Generally, the P-ratio≥0.80 is required in order to satisfy the corrosion resistance performance and the coating performance. In addition, under a severely corrosive environment such as an area where snow-melting salt is sprayed, the P-ratio≥0.85 is required.

The corrosion resistance after coating was evaluated through the following method. After the chemical conversion, electrodeposition coating with the thickness of 25 µm was performed, and coated baking was performed at 170° C.×20 min. Thereafter, a notch having a length of 130 mm was made in the electrodeposition coating film with a knife having a sharp tip such that the notch reached the base metal. Under a salt spray condition disclosed in JIS Z 2371, 5% salt spraying was continuously executed at the temperature of 35° C. for 700 h. Then, a tape (Nichiban 405A-24 JIS Z 1522) having the width of 24 mm was attached to the top of the cut portion in the length of 130 mm such that the tape became parallel to the cut portion, and the maximum coating film peeling range in the case where the tape was peeled off was measured. If the maximum coating film peeling range exceeded 4 mm, the corrosion resistance after coating was accepted to be subordinated.

The test Nos. 1, 4, 10, 11, 20 and 23 to 39 are examples of the present invention. These steel sheets satisfy all the requirements of the present invention, having the strength of grade level of 540 MPa or greater, TS (MPa)×El (%) of 19,000 MPa % or greater in the balance with respect to the strength, the hole expansion value of λ≥70%, notch fatigue properties of $\sigma_{WK}/TS$≥0.35, the surface defects of minor or less. That is, steel sheets are highly strengthened and are excellent in the elongation, the hole expansibility, the notch fatigue properties, the surface characteristics, and the corrosion resistance.

Meanwhile, the test Nos. 2, 3, 5 to 9, 12 to 19, 21, and 22 are Comparative Examples in which although the chemical composition satisfies the requirements of the present invention, the micro-structure is beyond the requirements of the present invention. These steel sheets have resulted such that any one of the elongation, the hole expansibility, the notch fatigue properties, the surface characteristics, and the corrosion resistance is unsatisfied. In addition, twelve pieces of steel of the test No. 40 to 51 are Comparative Examples in which the chemical composition is beyond the requirements of the present invention. Among those, the steel sheets of the test No. 45 and 46 satisfy the requirements of the present invention in the micro-structure. However, in all these steel sheets, any one of the elongation, the hole expansibility, the notch fatigue properties, the surface characteristics, and the corrosion resistance is unsatisfied.

INDUSTRIAL APPLICABILITY

According to the present invention, it is possible to obtain a high-strength steel sheet with strain induced transformation type composite structure having tensile strength of 540 MPa or greater while being excellent in strength elongation balance, hole expansibility, corrosion resistance, and notch fatigue properties and also being excellent in surface properties at the same time. The steel sheet with strain induced transformation type composite structure can be preferably used as a steel sheet for a wheel disk or the like and thereby has high industrial applicability.

The invention claimed is:

1. A steel sheet comprising, as a chemical composition, by mass %,
C: more than 0.075% and 0.150% or less,
Si: 0.50% or less,
Mn: 0.20% to 3.00%,
P: 0.010% or less,
S: 0.005% or less,
Al: 0.040% to 1.500%,
N: 0.0100% or less,
Ti: 0.015% to 0.200%,
Nb: 0% to 0.060%,
Cu: 0% to 1.20%,
Ni: 0% to 0.60%,
Mo: 0% to 1.00%,
V: 0% to 0.200%,
Cr: 0% to 2.00%,
W: 0% to 0.50%,
Mg: 0% to 0.0100%,
Ca: 0% to 0.0100%,
REM: 0% to 0.100%,
B: 0% to 0.0020%, and
a remainder comprising Fe and impurities,
wherein the chemical composition satisfies the following equation (i);
a microstructure at the ¼ thickness of the steel sheet includes, by area ratio, 50% to 85% of a polygonal ferrite, 3% to 10% of a residual austenite, 5% to 47% of a bainite, and 1% or less of a fresh martensite and a tempered martensite in total, and satisfies the following equation (ii),
wherein the microstructure includes $1\times10^{16}$ pieces/cm$^3$ or more of precipitates containing a TiC,
an average grain diameter of the residual austenite is 1.0 μm to 5.0 μm at an equivalent circle diameter,
an average of closest distances of the residual austenite is 3.0 μm to 10.0 μm, and
an average diameter of the precipitates is 3 nm or less, $$Ti-48\times(N/14+S/32)\geq 0 \quad \text{(i)}$$

$$0.01<Ex.C/fsd<0.015 \quad \text{(ii)}$$

where symbols for elements in the equations are amounts of the elements included in the steel sheet by mass %,
the fsd in the equation (ii) is an area ratio (%) of the residual austenite in the microstructure, and
Ex.C is calculated by the following equation (iii), $$Ex.C=C-12\times(Ti/48+Nb/93-N/14-S/32) \quad \text{(iii)}$$

2. The steel sheet according to claim 1,
wherein the chemical composition includes, by mass %, one or more selected from the group consisting of
Nb: 0.005% to 0.060%,
Cu: 0.02% to 1.20%,
Ni: 0.01% to 0.60%,
Mo: 0.01% to 1.00%,
V: 0.01% to 0.200%,
Cr: 0.01% to 2.00%, and
W: 0.01% to 0.50%.

3. The steel sheet according to claim 1,
wherein the chemical composition includes, by mass %, one or more selected from the group consisting of
Mg: 0.0005% to 0.0100%,
Ca: 0.0005% to 0.0100%, and
REM: 0.0005% to 0.100%.

4. The steel sheet according to claim 1,
wherein the chemical composition includes, by mass %,
B: 0.0002% to 0.0020%.

5. The steel sheet according to claim 1, the steel sheet further comprising:
a galvanized layer on a surface.

6. A method of manufacturing a steel sheet comprising:
a heating process of heating a slab having the chemical composition according to claim 1 to SRTmin (° C.), which is defined by the following equation (iv), or higher;
a rough rolling process to obtain a rough bar in which one pass or more of rolling with 20% or higher of a rolling reduction is performed on the slab in a first temperature range from 950° C. to 1,050° C. with 60% to 90% of total rolling reduction after the heating process;
a finish rolling process to obtain a steel sheet in which finish rolling is performed on the rough bar,
wherein the finish rolling process starts in a second temperature range of 930° C. or higher and lower than 1,000° C. within 150 seconds after the rough rolling and ends in a third temperature range from an Ar$_3$ transformation point, which is expressed by the following equation (x), to the Ar$_3$ transformation point+80° C.; and
a cooling process of performing a first cooling, a second cooling, a third cooling and an winding,
wherein the steel sheet is cooled to a fourth temperature range of 600° C. or more and lower than the Ar$_3$ transformation point within 3 seconds after the finish rolling process at an average cooling rate of 15° C./s or faster in the first cooling,
the steel sheet is cooled from the fourth temperature range to a fifth temperature range of higher than 600° C. and 700° C. or lower at the average cooling rate of 10° C./s or slower in a time of 1 second or longer and shorter than 10 seconds in the second cooling,
the steel sheet is cooled from the fifth temperature range to a sixth temperature range of higher than 350° C. and 450° C. or lower at a cooling rate of 15° C./s or faster in the third cooling, and
the steel sheet is wound in the sixth temperature range in the winding,
wherein in the finish rolling process, at least two passes of rolling is performed with 75% to 95% of the total rolling reduction, and
wherein in the cooling process, a total cumulative diffusion length Ltotal (μm) of Ti in the polygonal ferrite expressed by the following equation (vii) satisfies the following equation (v), $$SRTmin=7,000/\{2.75-\log_{10}(Ti\times C)\}-273 \quad \text{(iv)}$$

$$Ar_3=910-310\times C+25\times(Si+2\times Al)-80\times Mneq \quad \text{(x)}$$

where symbols for elements in the equations are amounts of the elements included in the steel sheet by mass %, Mneq is expressed by the following equation (xi) in a case where B is not included in the steel sheet and is expressed by the following equation (xii) in a case where B is included in the steel sheet, $$Mneq = Mn + Cr + Cu + Mo + Ni/2 + 10 \times (Nb - 0.02) \qquad (xi)$$

$$Mneq = Mn + Cr + Cu + Mo + Ni/2 + 10 \times (Nb - 0.02) + 1 \qquad (xii)$$

$$0.15 \leq Ltotal \leq 0.4 \qquad (v)$$

$$Ltotal = \Sigma(\sqrt{(D \times (T+273) \times \Delta t)}) \qquad (vii)$$

where, $D \times (T+273)$ in the equation (vii) indicates a body diffusion coefficient at T° C. in μm²/s and is expressed using a diffusion coefficient $D_0$ of Ti in μm²/s, activation energy Q in kJ/mol, and a gas constant R in kJ/mol·K as shown in the following equation (viii), and $\Delta t$ is an infinitesimal difference of time from the third cooling to the winding, $$D \times (T+273) = D_0 \times \mathrm{Exp}(-Q/R \times (T+273)) \qquad (viii)$$

thereby producing the steel sheet of claim 1.

7. The method of manufacturing a steel sheet according to claim 6,
wherein in the rough rolling process, at least two passes of rolling is performed.

8. The method of manufacturing a steel sheet according to claim 6, the method further comprising:
a galvanizing process of galvanizing the steel sheet by immersing the steel sheet into a galvanizing bath after the cooling process.

9. The method of manufacturing a steel sheet according to claim 8, the method further comprising:
an alloying treatment process of performing an alloying treatment on the steel sheet by heating the steel sheet to a temperature range from 450° C. to 600° C. after the galvanizing process.

* * * * *